US012533406B2

(12) United States Patent
Clube

(10) Patent No.: US 12,533,406 B2
(45) Date of Patent: Jan. 27, 2026

(54) PARTICLES, DNA AND RNA

(71) Applicant: NOVOSCOPE IP LIMITED, Fordingbridge (GB)

(72) Inventor: Jasper Clube, London (GB)

(73) Assignee: NOVOSCOPE IP LIMITED, Fordingbridge (GB)

( * ) Notice: Subject to any disclaimer, the term of this patent is extended or adjusted under 35 U.S.C. 154(b) by 674 days.

(21) Appl. No.: 17/918,304

(22) PCT Filed: Apr. 3, 2021

(86) PCT No.: PCT/EP2021/058821
§ 371 (c)(1),
(2) Date: Oct. 11, 2022

(87) PCT Pub. No.: WO2021/209275
PCT Pub. Date: Oct. 21, 2021

(65) Prior Publication Data
US 2023/0346917 A1 Nov. 2, 2023

(30) Foreign Application Priority Data

| Apr. 12, 2020 | (GB) | ................................ | 2005369 |
| Apr. 13, 2020 | (GB) | ................................ | 2005385 |
| Apr. 18, 2020 | (GB) | ................................ | 2005650 |
| Apr. 19, 2020 | (GB) | ................................ | 2005660 |

(51) Int. Cl.
*A61K 39/00* (2006.01)
*A61K 9/00* (2006.01)
*A61K 39/215* (2006.01)
*A61P 31/14* (2006.01)
*C12N 7/00* (2006.01)
*C12N 15/86* (2006.01)

(52) U.S. Cl.
CPC .......... *A61K 39/215* (2013.01); *A61K 9/0078* (2013.01); *A61P 31/14* (2018.01); *C12N 7/00* (2013.01); *C12N 15/86* (2013.01); *A61K 2039/5254* (2013.01); *A61K 2039/5258* (2013.01); *A61K 2039/53* (2013.01); *A61K 2039/54* (2013.01); *C12N 2770/20022* (2013.01); *C12N 2770/20023* (2013.01); *C12N 2770/20034* (2013.01); *C12N 2770/20043* (2013.01); *C12N 2770/20051* (2013.01); *C12N 2770/20062* (2013.01)

(58) Field of Classification Search
CPC ............ A61K 2039/5254; A61K 35/76; A61K 39/215; A61K 2039/53; A61P 31/14
See application file for complete search history.

(56) References Cited

FOREIGN PATENT DOCUMENTS

| EP | 1741789 A1 | 1/2007 |
| WO | 2016165825 A1 | 10/2016 |
| WO | 2017180770 A1 | 10/2017 |
| WO | 2021209275 A1 | 10/2021 |

OTHER PUBLICATIONS

Almazan, F. et al. (Nov. 11, 2006, e-pub. Aug. 23, 2006). "Construction Of A Severe Acute Respiratory Syndrome Coronavirus Infectious cDNA Clone And A Replicon To Study Coronavirus RNA Synthesis," J Virol. 80(21):10900-10906.
An, S. et al. (Nov. 1998). "Coronavirus Transcription Early In Infection," J Virol. 72(11):8517-8524.
Ge, F. et al. (Mar. 30, 2007, e-pub. Nov. 13, 2006). "Derivation Of A Novel SARS-Coronavirus Replicon Cell Line And Its Application For Anti-SARS Drug Screening," Virology 360(1):150-158.
GenBank Accession No. NC045512.2, last updated Jul. 18, 2020, "Severe Acute Respiratory Syndrome Coronavirus 2 Isolate Wuhan-Hu-1, Complete Genome," located at "https://www.ncbi.nim.nih.gov/nuccore/NC_045512.2/", last visited on Jan. 25, 2023, 16 pages.
International Preliminary Report on Patentability issued on Oct. 13, 2022, for PCT Application No. PCT/EP2021/058821, filed on Apr. 3, 2021, 11 pages.
International Search Report and Written Opinion of the International Searching Authority mailed on Jul. 20, 2021, for PCT Application No. PCT/EP2021/058821, filed on Apr. 3, 2021, 17 pages.
Lee, E.B. et al. (2019, e-pub. Feb. 7, 2019). "Liver-specific Gene Delivery Using Engineered Virus-Like Particles of Hepatitis E Virus," Sci Rep. 9(1):1616, 10 pages.
Marra, M. A. et al. (May 30, 2003, e-pub. May 1, 2003). "The Genome Sequence of the SARS-associated Coronavirus," Science 300(5624):1399-1404, 13 pages.
Masters, P. S. (Nov. 2019, e-pub. Aug. 30, 2019). "Coronavirus Genomic RNA Packaging," Virology 537:198-207.
Molenkamp, R. et al. (Apr. 2000). "Isolation And Characterization Of An Arterivirus Defective Interfering RNA Genome," J Virol. 74(7):3156-3165.
Pasternak, A. O. et al. (Aug. 2004). "Regulation Of Relative Abundance Of Arterivirus Subgenomic mRNAs," J Virol. 78(15):8102-8113.
Takamura, S. et al. (Apr. 2004). "DNA Vaccine-Encapsulated Virus-Like Particles Derived From An Orally Transmissible Virus Stimulate Mucosal And Systemic Immune Responses By Oral Administration," Gene Ther. 11(7):628-635.

(Continued)

*Primary Examiner* — Barry A Chestnut
(74) *Attorney, Agent, or Firm* — MORRISON & FOERSTER LLP

(57) ABSTRACT

The invention provides competitive particles, such as virus-like particles, RNAs and DNAs for the treatment or prevention of viral infections and methods of using such particles for treating or preventing or reducing the risk of viral infections (or symptoms thereof) in a subject, such as a human or animal subject. For example, the method herein is a method of reducing or reducing the establishment of a zoonotic population of a virus in an animal, such as a livestock or wild animal (eg, a bat, camelid or a Pholidota (eg, a pangolin)).

25 Claims, No Drawings
Specification includes a Sequence Listing.

(56) References Cited

OTHER PUBLICATIONS

Thiel, V. et al. (Sep. 2003). "Multigene RNA Vector Based On Coronavirus Transcription," J Virol. 77(18):9790-9798.
Wu, C-J. et al. (Jan. 2005, e-pub. Nov. 20, 2004). "Inhibition of SARS-CoV Replication by siRNA," Antiviral Res. 65(1):45-48.

PARTICLES, DNA AND RNA

CROSS REFERENCE TO RELATED APPLICATIONS

This application is a national stage application under 35 U.S.C. § 371 of International Application No. PCT/EP2021/058821, filed internationally on Apr. 3, 2021, which claims the benefit of United Kingdom Application Nos. 2005369.0, filed Apr. 12, 2020, 2005385.6, filed Apr. 13, 2020, 2005650.3, filed Apr. 18, 2020 and 2005660.2, filed Apr. 19, 2020, the disclosures of which are herein incorporated by reference in their entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 265462000100SUBSEQLIST.TXT, date recorded: Feb. 23, 2023, size: 3,476 bytes).

TECHNICAL FIELD

The invention provides particles, such as virus-like particles (VLPs) and non-self replicative particles for the treatment or prevention of viral infections and methods of using such particles for treating or preventing or reducing the risk of viral infections (or symptoms thereof) in a subject, such as a human or animal subject. The particles (eg, VLPs) are competitive with the virus in host cells, thereby reducing replication or propagation of the virus. For example, the method herein is a method of reducing or reducing the establishment of a zoonotic population of a virus in an animal, such as a livestock or wild animal (eg, a bat, camelid or a Pholidota (eg, a pangolin)).

BACKGROUND

The best studied nidoviruses, the corona- and arteriviruses, employ a unique transcription mechanism, which involves discontinuous RNA transcription, a process resembling similarity-assisted copy-choice RNA recombination. During infection, multiple subgenomic (sg) mRNAs are transcribed from a mirror set of sg negative-strand RNA templates. The sg mRNAs all possess a short 5' common leader sequence (L), derived from the 5' end of the genomic RNA. The joining of the non-contiguous 'leader' (TRS-L) and 'body' (TRS-B) sequences presumably occurs during minus-strand synthesis. For all nidoviruses, the 5'-most two-thirds of the genome are taken up by the replicase polyprotein gene. Downstream, there are multiple smaller genes, which are expressed from a nested set of up to eight sg mRNAs. In the case of the arteri- and coronaviruses, these sg mRNAs are chimeric and both 3'- and 5'-coterminal with the genome: they all possess a 5' common leader sequence, which is derived from the 5' terminus of the genomic RNA and fused to the 'body' of the transcript (i.e. the 3'-terminal part, which carries the coding information). Coronavirus leaders are 55-92 nucleotides in length, whereas those of arteriviruses measure ~200 nucleotides. The leader and mRNA body sequences are joined within a short conserved sequence motif, the transcription-regulating sequence (TRS), which precedes each transcription unit. Snijder and co-workers provided persuasive evidence that, in arteriviruses, leader-body fusion occurs during the synthesis of (−) strand RNA, presumably via a process resembling similarity-assisted copy-choice RNA recombination. Template switching apparently is guided by base pairing between the anti-TRS on the nascent sg (−) strand and the 5'-most genomic TRS.

Severe Acute Respiratory Syndrome (SARS) coronavirus, SARS-COV, is a single-stranded positive RNA virus with a genome size around 29,700 nucleotides (nt), and has a typical coronavirus genomic organization that encodes for at least 14 open reading frames (ORFs). The first two thirds of SARS-COV genome produces two large, overlapping ORFs (ORF 1a and ORF 1b). The other 12 ORFs are generated from the remaining one third of the viral genome. After infecting host cells, such as human lung cells, via membrane fusion and endocytosis, SARS-COV releases its genetic content into the cytoplasm and immediately synthesizes the two large polyproteins pp1a and pp1ab from ORF 1a and ORF 1b involving a process called programmed-1 ribosomal frame-shift. The polyproteins pp1a and pp1ab are subsequently subjected to proteolytic processing for the generation of 16 non-structural proteins, including proteins which are essential for viral genome replication and viral RNA synthesis. The ORFs from 5' to 3' direction located at the 3' ⅓ of SARS-COV genome encode four major genes encoding structural protein S (ORF 2), E (ORF 4), M (ORF 5) and N (ORF 9). The remaining ORFs encode the other 8 accessory protein. Two ORFs, ORF3a and ORF3b, are located between S and E genes, ORF 6, 7a, 7b, 8a and 8b are between M and N genes, while N gene also contains an internal ORF 9b protein to shuttle between cytoplasm and nucleus and to induce anti-innate immune response.

Upon the production of viral replicase proteins, SARS-COV undergoes the second stage of viral infection by initiating viral genomic transcription and replication for the generation of the positive genome sized RNA as well as a nested set of 3' co-terminal sub-genomic mRNAs (sgmRNAs) with an identical 5' leader sequence of 55 to 100 nucleotides via discontinuous transcription. For synthesizing the negative strand sub-genomic RNAs, a replication-transcription complex (RTC) processes along the positive RNA genome template from its 3' end, and then either reads the body TRS (TRS-B) upstream of each ORF as an attenuation signal and relocates the nascent RNA to copy the genomic leader sequence by recognizing the 3' leader TRS (TRS-L), or continuously transcribes through to meet next TRS-B. TRSs contain a conserved 6-7 nt core element sequence (CE) surrounded by variable sequences. The production of minus stranded RNAs serves to provide replication templates for the subsequent synthesis of mRNA. During negative-strand synthesis, RdRP (RNA-dependent RNA polymerase) pauses when it crosses a TRS in the body (TRS-B), and switches the template to the TRS in the leader (TRS-L), which results in the leader-body fusion. From the fused negative-strand intermediates, positive-strand mRNAs are transcribed. Short sgRNAs encode conserved structural proteins (spike protein(S), envelope protein (E), membrane protein (M), and nucleocapsid protein (N)), 63 and several accessory proteins.

Like other coronaviruses (order Nidovirales, family Coronaviridae), SARS-COV-2 is an enveloped virus with a positive-sense, single-stranded RNA genome of ~30 kb. SARS-COV-2 belongs to the genus betacoronavirus, together with SARS-COV and Middle East respiratory syndrome coronavirus (MERS-COV) (with 80% and 39 50% homology, respectively. Coronaviruses (CoVs) were thought to primarily cause enzootic infections in birds and mammals. But, the recurring outbreaks of SARS, MERS, and subsequently COVID-19 have clearly demonstrated the remarkable ability of CoVs to cross species barriers and transmit between humans. SARS-Cov-2 shares many similarities to SARS-Cov, including infectivity that relies on binding to ACE2 on human cells. These viruses are coronaviruses that are thought to share similar discontinuous transcription. In addition to the 8 genomic RNA, SARS-COV-2 produces sub-genomic type RNAs, a type common in all coronaviruses. SARS-COV-2 is known to have six accessory proteins (3a, 6, 7a, 7b, 8, and 10) according to the current annotation (NCBI 65 Reference Sequence: NC_045512.2). The SARS-COV-2 (formerly 2019-nCOV) genome is arranged in the order of 5'-replicase (orf1/ab)-structural proteins [Spike(S)-Envelope (E)-Membrane (M)-Nucleocapsid (N)]-3' and lacks the hemagglutinin-esterase gene which is characteristically found in lineage A β-CoVs. Spike glycoprotein of SARS-COV-2 is comprised of S1 and S2 subunits. The S1 subunit contains a signal peptide, followed by an N-terminal domain (NTD) and receptor-binding domain (RBD), while the S2 subunit contains conserved fusion peptide (FP), heptad repeat (HR) 1 and 2, transmembrane domain (TM), and cytoplasmic domain (CP). The S2 subunit of SARS-COV-2 is highly conserved and shares 99% identity with those of the two bat SARS-like CoVs (SL-CoV ZXC21 and ZC45) and human SARS-COV. The genome of SARS-COV-2 has overall 89% nucleotide identity with bat SARS-related-CoV SL-CoVZXC21 (MG772934.1), and 82% with human SARS-COV BJ01 2003 (AY278488) and human SARS-COV Tor2 (AY274119).

STATEMENT OF INVENTION

The invention is useful for treating or preventing or reducing the risk of viral infections of subjects, wherein the viruses engage in discontinuous transcription as part of their life cycles. The invention also provides methods of diagnosis of infection with such a virus in a human or animal subject, methods of detecting viral nucleic acid, and methods of producing particles comprising RNAs.

In a First Configuration the Invention Provides:

A particle (eg, a virus-like particle (VLP)) for administration to a human or animal subject to treat or reduce the risk of an infection of the subject by a virus, wherein the virus comprises an RNA genome, wherein the virus is capable of infecting host cells of the subject (eg, human cells), the virus genome comprising an RNA sequence (L) wherein L comprises a first Transcription Regulatory Sequence Core Element (TRS-CE1), wherein replication of the virus comprises the transcription of a first sub-genomic RNA (sgRNA1), wherein sgRNA1 comprises a second transcription regulatory sequence core element (TRS-CE2), wherein TRS-CE1 is capable of hybridising to TRS-CE2 in the host cells;

wherein the particle comprises RNA, wherein the particle is capable of introducing the particle RNA into host cells of the subject for transcription of the particle RNA, wherein the particle RNA or a transcript thereof comprises a TRS-CE (eg, a Transcription Regulatory Sequence Body Core Element (TRS-B CE)); wherein when the viral RNA is present in a host cell with the particle RNA or the transcript, the TRC-CE of the particle RNA or transcript hybridises to a TRS-CE (eg, Transcription Regulatory Sequence Leader Core Element (TRS-L CE)) comprised by the viral RNA;

wherein the hybridising of the particle RNA or transcript TRS-CE (eg, TRS-B CE) to a TRS-CE (eg, TRS-L CE) comprised by the viral RNA (eg, comprised by the viral RNA genome) reduces viral replication.

For example, both the viral RNA genome and the particle RNA are (+)ss RNAs.

An Aspect of the First Configuration Provides:

A virus-like particle (VLP) for administration to a human or animal subject to treat or reduce the risk of an infection of the subject by a virus, wherein the virus comprises an RNA genome, wherein the virus is capable of infecting host cells of the subject (eg, human cells), the virus genome comprising an RNA sequence (L) wherein L comprises a first Transcription Regulatory Sequence Core Element (TRS-CE1), wherein replication of the virus comprises the transcription of a first sub-genomic RNA (sgRNA1), wherein sgRNA1 comprises a second Transcription Regulatory Sequence Core Element (TRS-CE2), wherein TRS-CE1 is capable of hybridising to TRS-CE2 in the host cells;

wherein the VLP comprises RNA, wherein the VLP is capable of introducing the VLP RNA into host cells of the subject for transcription of the VLP RNA, wherein the VLP RNA or a transcript thereof (i) comprises (a) TRS-CE1 or (b) a sequence that is capable of hybridising to TRS-CE1 in a host cell; and/or (ii) comprises (a) TRS-CE2 or (b) a sequence that is capable of hybridising to TRS-CE2 in a host cell; wherein the viral RNA is present in a host cell with the VLP RNA or the transcript, (iii) component (i) (a) hybridises to TRS-CE2 comprised by sgRNA1 encoded by the viral RNA; (iv) component (i) (b) hybridises to TRS-CE1 comprised by the viral RNA;

(v) component (ii) (a) hybridises to TRS-CE1 comprised by the viral RNA; and/or (vi) component (ii) (b) hybridises to TRS-CE2 comprised by sgRNA1 encoded by the viral RNA; wherein the hybridising of any of (iii) to (vi) reduces viral replication.

In a second configuration the invention provides:

A composition comprising a plurality of VLPs according to the invention

In a third configuration the invention provides:

A method for treating or reducing the risk of an infection of a human or animal subject by a virus, the method comprising administering the composition to the subject.

In a fourth configuration the invention provides:

A method for treating or reducing the risk of a symptom (eg, inflammation) of an infection of a human or animal subject by a virus, the method comprising administering the composition to the subject.

In a fifth configuration the invention provides:

A method of inhibiting replication of a virus in a host cell, wherein the virus comprises a (+)ss RNA genome wherein the viral genome comprises a TRS-L CE and encodes an sgRNA transcript comprising a TRS-B CE (CE2), the method comprising a) contacting the host cell with a particle of the invention (or RNA or the invention) and introducing the particle RNA (or RNA) into the host cell, wherein the particle RNA is a (+)ss RNA that comprises a sequence that is a complement (eg, a 100% or at least an 80% complement) of the CE2;

b) simultaneously to step (a), subsequent to step (a) or before step (a) the viral RNA genome is introduced into the host cell; and a transcription process is carried out wherein the particle RNA is transcribed in the cell to produce an RNA transcript comprising CE2 or a sequence that is capable of hybridising to a viral TRS-L CE, wherein the transcript hybridises to a TRS-L CE comprised by (+)ss RNA of the virus to form an RNA hybrid, and the hybrid is used to produce a mRNA comprising a leader sequence (L), wherein the leader is not operably linked to an RNA sequence that encodes an amino acid sequence (A) of a protein required for replication, propagation or infectivity of said virus.

In a sixth configuration the invention provides:

A method of producing a plurality of particles, the method comprising combining a plurality of particles (eg, VLPs, liposomes, nanoparticles, exosomes or microvesicles) with a plurality of RNAs, wherein each RNA is an RNA of the invention, wherein at least one RNA is incorporated in and/or on a respective particle of the plurality of particles; and optionally formulating the particles to produce a pharmaceutical composition for administration to a human or animal subject to treat or prevent viral infection.

In a seventh configuration the invention provides:

A method of detecting virus RNA in a sample, wherein the virus replicates using a discontinuous RNA transcription process comprising hybridizing of a first TRS-CE (CE1) with a second TRS-CE (CE2), the method comprising contacting the sample with a RNA of the invention (first RNA) and detecting a hybrid formed between the first RNA and a virus RNA comprised by the sample.

In a eighth configuration the invention provides:

Use of an RNA of the invention for diagnosing a viral infection in a human or animal subject, wherein the virus replicates using a discontinuous RNA transcription process.

In a ninth configuration the invention provides:

A method of treating or preventing a viral infection in a human or animal subject, the method comprising administering to the subject a particle or RNA of the invention.

DETAILED DESCRIPTION

The invention is useful for treating or preventing or reducing the risk of viral infections of subjects, wherein the viruses engage in discontinuous transcription as part of their life cycles. Thus, preferably, the virus is a virus that replicates using discontinuous RNA transcription. Herein, the particles are exemplified by VLPs, but where VLP is written herein, where the context permits the description may in the alternative apply mutatis mutandis to particles generally, such as pharmaceutically acceptable particles, examples of which will be evident to the skilled addressee.

The invention provides particles, such as virus-like particles, for the treatment or prevention of viral infections and methods of using such particles for treating or preventing or reducing the risk of viral infections (or symptoms thereof) in a subject, such as a human or animal subject. For example, the method herein is a method of reducing or reducing the establishment of a zoonotic population of a virus in an animal, such as a livestock or wild animal (eg, a bat, camelid or a Pholidota (eg, a pangolin)). In a host cell, the VLP usefully is capable of producing sgRNAs comprising the viral leader. Such sgRNAs compete with the cell's translation machinery, diverting away from sgRNAs produced by viral nucleic acid in the cell. The VLP-derived sgRNAs may not comprise any open reading frame (ORF) or may encode a protein which is not required for replication, propagation or infectivity of the virus, eg, the protein may even be an anti-viral protein that further reduces viability of the virus in the subject. Competition is also provided at the level of transcription when sgRNAs are produced; in this instance sgRNA intermediates are transcribed using the particle or VLP RNA, wherein each intermediate comprises at its 3' end a TRS sequence (a TRS-B) with core element (CE2) that can hybridise to the core element (CE1) of the TRS sequence (TRS-L) of the virus genome. This is useful, for example, when the virus is a (+)ssRNA virus, the particle RNA of the invention is a (+)ssRNA and the intermediate is a (−)ssRNA. In this way, this hybridisation competes with the need of the viral TRS-Bs to hybridise to TRS-Ls, thus the occurrence of the latter event is reduced or eliminated and viral mRNAs are reduced or eliminated. Thus, for example, this reduces the production of one, more or all viral structural proteins, such as M, S, E and N in the cell, which reduces viral replication or propagation, Thereby the invention is useful for treating, preventing or reducing the risk of viral infection or a symptom thereof, such as inflammation. An additional level of competition may be present, for example, where the particle or VLP comprises the ligand (eg, spike protein) that is cognate to the cellular receptor (eg, ACE2) for the virus; in this way the VLP competes with the virus in the subject for entry into host cells, which may further contribute to reduction of viral infection or its establishment in a prophylaxis regime. For example, the virus is a coronavirus that attaches to host cells of the subject by binding its spike protein to ACE2 protein on the cell surface, and the particles of the invention also comprises surface spike protein (eg, which is identical to the spike protein produced by the virus), whereby the particles compete with virus particles for attaching to host cells, thereby reducing infectivity of the virus in the subject.

When the VLP, composition or method is for treating or preventing infection of the virus in an animal, this is advantageous for reducing a zoonotic population of viruses that are transmissible to humans, wherein the viruses are capable of causing viral infection or a disease or condition (or death) in humans. In this respect, the animal may be a livestock animal, such as a pig, poultry (eg, chicken, duck or turkey), sheep, cow, goat, fish or shellfish. In an example, the animal is a bat, racoon dog, pangolin, dog, cat, palm civet or camelid (eg, a camel or dromedary). In an example, the animal is a bird.

In an embodiment, there is provided:

A virus-like particle (VLP) for administration to a human or animal subject to treat or reduce the risk of an infection of the subject by a virus, wherein the virus comprises an RNA genome, wherein the virus is capable of infecting host cells of the subject (eg, human cells), the virus genome comprising an RNA sequence (L) wherein L comprises a first Transcription Regulatory Sequence Core Element (TRS-CE1), wherein replication of the virus comprises the transcription of a first sub-genomic RNA (sgRNA1), wherein sgRNA1 comprises a second transcription regulatory sequence core element (TRS-CE2), wherein TRS-CE1 is capable of hybridising to TRS-CE2 in the host cells;

wherein the VLP comprises RNA, wherein the VLP is capable of introducing the VLP RNA into host cells of the subject for transcription of the VLP RNA, wherein the VLP RNA or a transcript thereof (i) comprises (a) TRS-CE1 or (b) a sequence that is capable of hybridising to TRS-CE1 in a host cell; and/or (ii) comprises (a) TRS-CE2 or (b) a sequence that is capable of hybridising to TRS-CE2 in a host cell;

wherein the viral RNA is present in a host cell with the VLP RNA or the transcript, (iii) component (i) (a) hybridises to TRS-CE2 comprised by sgRNA1 encoded by the viral RNA;

(iv) component (i) (b) hybridises to TRS-CE1 comprised by the viral RNA;

(v) component (ii) (a) hybridises to TRS-CE1 comprised by the viral RNA; and/or (vi) component (ii) (b) hybridises to TRS-CE2 comprised by sgRNA1 encoded by the viral RNA;

wherein the hybridising of any of (iii) to (vi) reduces viral replication.

As the skilled addressee will know, in viruses that carry out discontinuous RNA transcription as part of viral replication, TRS-CE1 hybridises to TRS-CE2 in the host cells in a process that produces mRNA transcripts. Translation of the transcripts is necessary to express viral proteins that are required for viral replication.

In one embodiment, the VLP RNA comprises TRS-CE1 and TRS-CE2 or a plurality of copies of TRS-CE2. For example, the VLP RNA is capable of expressing a plurality of mRNAs such as those described herein, each comprising a TRS-CE2.

Optionally, L encodes a leader peptide, for example a peptide comprising or consisting of 2 consecutive amino acids, eg, comprising no more than 10, 20, 30, 40, 50, 60 70, 80, 90, 100, 150, 200 or 250 consecutive nucleotides.

In an example, sgRNA1 is a (−) ss RNA, the particle RNA is a (+)ssRNA and the viral genome is a (+)ss RNA.

Additionally, in an embodiment the VLP RNA (i) comprises TRS-CE1; and/or (ii) a sequence that is capable of hybridising to TRS-CE2 in a host cell;

wherein when the viral RNA is present in a host cell with the VLP RNA, (iii) component (i) hybridises to TRS-CE2 comprised by sgRNA1 encoded by the viral RNA; and/or (iv) a transcript of component (ii) hybridises to TRS-CE1 comprised by the viral RNA;

wherein the hybridising of (iii) and/or (iv) reduces viral replication.

Additionally or alternatively to (iii), component (i) hybridises to TRS-CE2 comprised by a transcript of component (ii). Thus in a host cell, a TRS-CE1 in a copy of the particle RNA may hybridise to a TRS-CE2 comprised by a transcript of particle RNA; and a TRS-CE1 in a different copy of the particle RNA may hybridise to a TRS-CE2 comprised by a sgRNA1 transcribed from the viral genome. In this way, the first hybridisation may produce a hybrid that is non-productive for expression of a viral protein that is required for viral replication or infectivity, since the particle RNA is not transcribable into an RNA sequence that encodes a such a protein. Furthermore, the second hybridisation may produce a hybrid that is non-productive for expression of a viral protein that is required for viral replication or infectivity, since the particle RNA comprises an RNA sequence immediately 3' of the TRS-CE1 that (a) comprises a stop codon and/or encodes a peptide that is not a viral peptide, or is non-functional for use in replication or infectivity of the virus, or (b) is an anti-viral agent. Thus, either no protein is produced using the leader comprising TRS-CE1 or a peptide is produced that is not usable by the virus for replication or infectivity, or the protein inhibits viral replication or infectivity.

Preferably, the CE1 of the VLP RNA is comprised by a TRS-L sequence, such as a TRS-L sequence that is identical to or at least 90, 95, 96, 97, 98 or 99% identical to a TRS-L sequence of the virus. In an example, the virus is a CoV virus (eg, a SARS-COV-2) and the CE1 of the VLP RNA is comprised by a TRS-L sequence, such as a TRS-L sequence that is identical to or at least 90, 95, 96, 97, 98 or 99% identical to a TRS-L sequence of the virus or a different CoV (eg, a SARS-COV). For example, the virus is a SARS-COV and the different virus is selected from a SARS-COV, SARS-Cov2 and MERS-Cov. For example, the virus is a SARS-COV-2 and the different virus is selected from a SARS-COV, SARS-Cov2 and MERS-Cov. For example, the virus is a MERS-COV and the different virus is selected from a SARS-COV, SARS-Cov2 and MERS-Cov.

Preferably, the CE2 is comprised by a TRS-B sequence, such as a TRS-B sequence that is identical to or at least 90, 95, 96, 97, 98 or 99% identical to a TRS-B sequence of the virus. In an example, the virus is a CoV virus (eg, a SARS-COV-2) and the CE1 of the VLP RNA is comprised by a TRS-L sequence, such as a TRS-L sequence that is identical to or at least 90, 95, 96, 97, 98 or 99% identical to a TRS-L sequence of the virus or a different CoV (eg, a SARS-COV). For example, the virus is a SARS-COV and the different virus is selected from a SARS-COV, SARS-Cov2 and MERS-Cov. For example, the virus is a SARS-COV-2 and the different virus is selected from a SARS-COV, SARS-Cov2 and MERS-Cov. For example, the virus is a MERS-COV and the different virus is selected from a SARS-CoV, SARS-Cov2 and MERS-Cov.

Optionally, the CE1 and CE2 of the invention are identical respectively to CE1 and CE2 of the virus. Optionally, the TRS-L and/or TRS-B of the invention are identical respectively to CE1 and/or CE2 of the virus At a minimum, the effect of the hybridisation is that the VLP RNA (or transcripts thereof) competes with the viral sgRNAs for viral leader TRS-CE1 and/or competes with viral leader TRS-CE1 for viral sgRNA TRS-CE2 sequences. Thus, there is competition at least at the transcription level. Additionally, there may be competition for the translation machinery of the cell, since translation of mRNA hybrids comprising RNA sequence encoded or comprised by the VLP RNA will compete with full-viral mRNAs for use of the transcription and translation machinery. This will reduce the replication of virus.

For example, the VLP RNA comprises TRS-CE1 as part of a TRS-L sequence that is operably connected 3' of a regulatory region of the VLP RNA wherein said region is defective for initiating transcription and/or translation, or no transcription or translation initiation regulatory region is operatively connected 5' of the TRS-L, or the TRS-L is comprised by a sequence that is defective as a leader sequence. (In an example, in this case the VLP RNA is positive-strand ssRNA.) In this way, even if the TRS-CE1 of the VLP RNA hybridises to the TRS-CE2 of the viral sgRNA and a hybrid mRNA is produced (eg, a positive strand hybrid mRNA when the VLP RNA is positive-strand RNA), there will be no transcription and/or translation from the hybrid mRNA and thus no production of a viral gene product, eg, no production of a viral structural protein. Alternatively, the VLP RNA encodes a defective sequence comprising TRS-CE1, wherein the defective sequence cannot act as a leader sequence. For example, the defective sequence is a mutated version of the leader sequence of the viral RNA genome. In this way, even if a hybrid mRNA is produced and translated into protein, the protein cannot be properly processed by the cell. This, therefore, reduces the amount of available protein available for productive virus replication. Optionally, the VLP RNA comprises a plurality of leader sequences or defective sequences as described in this paragraph. Optionally, the VLP RNA comprises a plurality of leader sequences or defective sequences as described in this paragraph, whose transcription and/or translation is driven from a common regulatory region operably connected 5' of the 5'-most of said sequences in the VLP RNA. Thus, the VLP may then outcompete the single TRS-CE1 of the viral RNA genome for binding to CE2s of TRS-Bs comprised by sgRNAs encoded by the virus. In an example, each said leader sequence or defective sequence of the invention is transcribable using its own promoter (eg, a constitutive promoter or strong promoter), but the mRNA thereof of not functional for initiating translation, thereby enabling much more production of defective sequences of the invention than are produced by the viral genome. In an example, the or each promoter is a U6 promoter.

Additionally or alternatively to the example of the immediately preceding paragraph, the VLP RNA (eg, positive-strand ssRNA) may comprise a complement comprising a TRS-B comprising TRS-CE2 which complement encodes a RNA transcript that is capable of hybridising to CE1 of the TRS-L of the viral RNA genome. In this way, the transcript competes with sgRNAs encoded by the viral genome for binding to CE1 of the TRS-Ls encoded by the viral genome, thereby competing at the transcriptional and translational level. Preferably, the TRS-B or TRS-B complement of the VLP RNA is not operably linked to a sequence encoding a viral protein, such as a protein of the virus, such as a structural protein of the virus. For example, the TRS-B or TRS-B complement is not operably linked to an ORF or not operably linked to an ORF encoding a N, S, E or M protein of a virus or said virus. For example, the TRS-B or TRS-B complement is not operably linked to a sequence encoding a N, S, 7a, 3a, 8, M, E, 6, or 7b protein of said virus (or of any virus). Optionally, here the virus is a coronavirus, eg, a SARS-coronavirus. In this way, even if the CE2 comprised by the transcript (ie, the transcript encoded by and expressed using the VLP RNA as a template) hybridises to CE1 of a TRS-L of the viral RNA genome and there is RNA strand elongation to produce a mRNA, that mRNA will not be productive for translation into such a protein, and therefore no protein useful for viral replication will be created, thereby contributing to reduction of the viral infection, propagation or infectivity. In an example, the TRS-B or TRS-B complement is operably linked to an ORF for expressing an anti-viral protein (eg, interferon, such as a Type I interferon, or an Interferon-β) in the cell. Optionally, the VLP RNA comprises a plurality of said TRS-B or TRS-B complement sequences as described in this paragraph. Thus, the TRS-Bs derived from the VLP may then outcompete the TRS-Bs of the viral RNA genome for binding to CE1. In an example, each said TRS-B sequences or complements of the invention is transcribable using its own promoter (eg, a constitutive promoter or strong promoter), thereby enabling much more production of defective sequences of the invention than are produced by the viral genome. In an example, the or each promoter is a U6 promoter.

The SAR-Cov genome comprises the following gene configuration:

5'-replicase (orf1/ab)-[structural proteins: Spike(S)-Envelope (E)-Membrane (M)-Nucleocapsid (N)]-3'

In an embodiment, the VLP RNA comprises sequences encoding sgRNa TRS-Bs of the virus in the following order:

5'-[sequence encoding Spike(S) TRS-B]-[sequence encoding Envelope (E) TRS-B]-[sequence encoding Membrane (M) TRS-B]-[sequence encoding Nucleocapsid (N) TRS-B]-3'

In an embodiment, the VLP RNA comprises an RNA [sequence encoding Spike(S) TRS-B] of the virus. In an embodiment, the VLP RNA comprises an RNA [sequence encoding Envelope (E) TRS-B] of the virus. In an embodiment, the VLP RNA comprises an RNA [sequence encoding Membrane (M) TRS-B] of the virus. In an embodiment, the VLP RNA comprises an RNA [sequence encoding Nucleocapsid (N) TRS-B] of the virus.

Optionally, the [sequence encoding Spike(S) TRS-B] is immediately 5' of an RNA sequence encoding a truncated (eg, C-terminally truncated) or mutated S of the virus. For example, the RNA sequence is truncated compared to the entire S ORF of the viral RNA genome, and comprises the first 5, 10, 15, 20, 25, 30, 35, 40, 45, 50, 80, 100 or 150 consecutive nucleotides of the sequence encoding S in the viral RNA genome. This may be useful to preserve the native viral TRS-B/S-encoding sequence junction for proper transcription and/or translation of this part of the VLP RNA in the host cell. The truncated or mutated sequence may be translated into a correspondingly mutated or truncated form of the S protein which is not functional for viral replication, propagation or infectivity. Thus, such defective protein may be incorporated into any viral particles that may be produced by the cell, thereby hampering their infectivity when released from the cell. This too provides a way of reducing the viral infection in the subject. Additionally, the VLP and viral RNAs may recombine, thereby inserting defective sequence into the viral genome and rendering it non-functional for production of the protein. This too may contribute to reduction of the viral infection. Furthermore, if any viral particles are packaged in the host cell, some may package the defective sequence and these defective particles may be circulated in the subject in competition with wild-type virus particles, thereby providing a further way of reducing the infection. Indeed, virus particles may package copies of the VLP RNA and propagate these particles in the subject, whereby these particles may compete with wild-type virus particles. When VLP particles introduce their RNAs into host cells, these cells then become "immunised" and capable of expressing and engaging the competitive mechanisms of the invention as described herein. Thus, this also may act to reduce the viral infection in the subject.

The concepts in the immediately preceding paragraph apply mutatis mutandis to use of [sequence encoding Envelope (E) TRS-B]. The embodiments in the immediately preceding paragraph apply mutatis mutandis to use of [sequence encoding Membrane (M) TRS-B]. The embodiments in the immediately preceding paragraph apply mutatis mutandis to use of [sequence encoding Nucleocapsid (N) TRS-B]. In an embodiment, the concepts are used in the VLP RNA for each of S, E M and N and optionally one or more other ORFs found in the virus genome.

Optionally, the [sequence encoding Spike(S) TRS-B] is immediately 5' of an RNA sequence that is from 50-150%, or 80-120% (preferably 100%) of the size of the sequence that is immediately 5' of the S TRS-B in the viral RNA genome. Optionally, the [sequence encoding Envelope (E) TRS-B] is immediately 5' of an RNA sequence that is from 50-150%, or 80-120% (preferably 100%) of the size of the sequence that is immediately 5' of the S TRS-B in the viral RNA genome. Optionally, the [sequence encoding Membrane (M) TRS-B] is immediately 5' of an RNA sequence that is from 50-150%, or 80-120% (preferably 100%) of the size of the sequence that is immediately 5' of the S TRS-B in the viral RNA genome. Optionally, the [sequence encoding Nucleocapsid (N) TRS-B] is immediately 5' of an RNA sequence that is from 50-150%, or 80-120% (preferably 100%) of the size of the sequence that is immediately 5' of the S TRS-B in the viral RNA genome.

Optionally, the size from the 5'-most nucleotide of the [sequence encoding Spike(S) TRS-B] in the VLP RNA to the 3'-most nucleotide of the sequence encoding Nucleocapsid (N) TRS-B] in the VLP RNA is from 80-120% (optionally 100%) of the size from the 5'-most nucleotide of the [sequence encoding Spike(S) TRS-B] in the viral RNA genome to the 3'-most nucleotide of the sequence encoding Nucleocapsid (N) TRS-B] in the viral RNA genome.

Optionally, the size from the 5'-most nucleotide of the first sequence encoding a TRS-B to the 3'-most nucleotide of the last sequence encoding a TRS-B in the VLP RNA is from 80-120% (optionally 100%) of the size from the 5'-most nucleotide of the [sequence encoding Spike(S) TRS-B] in the viral RNA genome to the 3'-most nucleotide of the sequence encoding Nucleocapsid (N) TRS-B] in the viral RNA genome.

In an embodiment, replication of the virus comprises transcription of viral genome RNA to produce first and second sgRNA transcripts, wherein the sgRNAs share identical 5' sequences and the first sgRNA comprises a first TRS-B CE that is 3' of said 5' sequence, and the second sgRNA comprises a second TRS-B CE that is 3' of said 5' sequence, wherein the second sgRNA is longer than the first sgRNA; and wherein the viral genome RNA comprises a TRS-L, wherein the TRS-L is capable of hybridising separately to each of the TRS-B CEs. In an example of this embodiment, the RNA of the invention is transcribable (or transcribed) in a host cell to produce first and second RNA transcripts, wherein the first and second RNAs share identical 5' sequences and the first RNA comprises a first TRS-B CE that is 3' of said 5' sequence, and the second RNA comprises a second TRS-B CE that is 3' of said 5' sequence, wherein the second RNA is longer than the first RNA; and wherein each TRS-B CE of the RNAs is separately capable of hybridising to the TRS-L of the viral genome RNA. In an example, each of the viral genome RNA and the RNA of the invention is a (+)ssRNA and each said transcript of the virus and the RNA of the invention is a (−) ss RNA. In an alternative example, each of the viral genome RNA and the RNA of the invention is a (−) ssRNA and each said transcript of the virus and the RNA of the invention is a (+)ss RNA. Optionally, the viral genome RNA comprises first and second sequences encoding the first and second TRS-B CEs respectively of the sgRNAs, wherein the first and second sequences are separated by a sequence of X contiguous nucleotides; wherein the RNA of the invention comprises third and fourth sequences encoding the TRS-B CEs of the first and second RNA transcripts respectively, wherein the third and fourth sequences are separated by a sequence of Y contiguous nucleotides, wherein Y is from 50-150%, or 80-120% (eg, 90-110, or 100%) of X. For example, X is a 100 nt sequence and Y is a 80-120 nt (eg, 100 nt) sequence. Thus, this may be important to preserve the spacing between TRS-B CEs in transcripts produced by use of the RNA of the invention to mimic the spacing between TRS-B CEs in the viral replication process, which may be advantageous for efficient production of RNA transcripts of the invention and/or their use (such as hybridisation with a TRS-L of the virus). Optionally, each TRS-B CE of the transcripts is comprised by a TRS-B sequence, eg, a complement of a TRS shown in Table 1 or 2.

In an example, the RNA of the invention is transcribable (or transcribed) in a host cell to produce a plurality (eg, 2, 3, 4, 5, 6, 7, 8, 9 or 10) different RNA transcripts, each transcript comprising (eg, at the 3' end thereof) a TRS-B CE that is capable of hybridising in the host cell to a TRS-L of the viral RNA. Each TRS-B CE may be a CE sequence as disclosed herein, or is comprised by a TRS sequence as disclosed herein (or a complement of such a TRS-B). Optionally, the RNA transcripts are transcribed from a common promoter comprised by the RNA of the invention; or alternatively, each RNA is transcribed from a respective promoter (eg, a U6 promoter) comprised by the RNA of the invention. In this way, the RNA of the invention produces a plurality of RNA transcripts that compete with the sgRNAs produced by in viral replication, thereby reducing viral replication, such as for reducing or treating or preventing infection by the virus in a subject. Optionally, each TRS-B CE of the transcripts is comprised by a TRS-B sequence, eg, a complement of a TRS shown in Table 1 or 2.

In another example, the replication of the virus comprises the production of a third sgRNA comprising a TRS-B CE, wherein the third sgRNA is longer than the first and second sgRNAs and comprises said 5' sequence; and wherein the viral genome RNA a TRS-L is capable of hybridising to each of the TRS-B CE of the third sgRNA. In this example, the RNA of the invention may be transcribable (or transcribed) in a host cell to produce a third RNA transcript, wherein the first, second and third RNAs share identical 5' sequences and the third RNA comprises a third TRS-B CE that is 3' of said 5' sequence, wherein the third RNA is longer than the first and second RNAs; and wherein each TRS-B CE of the first, second and third RNAs is separately capable of hybridising to the TRS-L of the viral genome RNA. Optionally, the viral genome RNA comprises a third sequence encoding the third sgRNA TRS-B CE, wherein the second and third TRS-B CE-encoding sequences of the viral genome RNA are separated by a sequence of Z contiguous nucleotides; wherein the RNA of the invention comprises a fifth sequence encoding the TRS-B CE of the third RNA transcripts, wherein the fourth and fifth sequences are separated by a sequence of W contiguous nucleotides, wherein W is from 50-150%, or 80-120% (eg, 90-110, or 100%) of Z. For example, Z is a 100 nt sequence and W is a 80-120 nt (eg, 100 nt) sequence. Thus, this may be important to preserve the spacing between TRS-B CEs in transcripts produced by use of the RNA of the invention to mimic the spacing between TRS-B CEs in the viral replication process, which may be advantageous for efficient production of RNA transcripts of the invention and/or their use (such as hybridisation with a TRS-L of the virus). Optionally, each TRS-B CE of the transcripts is comprised by a TRS-B sequence, eg, a complement of a TRS shown in Table 1 or 2.

Optionally, the VLP RNA is capable of producing in a host cell (that has been infected with the virus) a mRNA, wherein the mRNA comprises a leader that is immediately 5' of an RNA sequence, wherein the RNA sequence is (i) at least 5, 10, 15, 20, 30, 40, 50, 60, 70, 80, 90, 100, 150, 200, 250, 300, 400, 500, 600, 700, 800, 900 or 1000 consecutive nucleotides in length; (ii) the same length as an ORF of the virus or no more than 5, 10, 15, 20, 30, 40, 50, 60, 70, 80, 90, 100, 150, 200, 250, 300, 400, 500, 600, 700, 800, 900 or 1000 consecutive nucleotides in length; or (iii) comprises AUG at its 5' end or consists of AUG. In an alternative, the RNA sequence is absent in the mRNA, wherein the mRNA consists of a leader sequence only and a poly-A tail. Herein, the VLP RNA may be capable of producing one or more mRNAs comprising a poly-A tail in a host cell (that has been infected with the virus), wherein none of the mRNA(s) encodes a protein that is required by the virus for replication. Herein, the VLP RNA may be capable of producing one or more mRNAs comprising a poly-A tail in a host cell (that has been infected with the virus), wherein none of the mRNA(s) encodes a protein that is required by the virus for infectivity. Herein, the VLP RNA may be capable of producing one or more mRNAs comprising a poly-A tail in a host cell (that has been infected with the virus), wherein none of the mRNA(s) encodes a functional S, M, N or E protein of the virus. Herein, the VLP RNA may be capable of producing one or more mRNAs comprising a poly-A tail in a host cell (that has been infected with the virus), wherein none of the mRNA(s) encodes a functional structural protein of the virus. Herein, the VLP RNA may be capable of producing one or more mRNAs comprising a poly-A tail in a host cell (that has been infected with the virus), wherein none of the mRNA(s) encodes a RdRp. In these embodiments, the VLP RNA produces mRNAs that are defective for viral replication and/or infectivity and thus these mRNAs compete with mRNAs encoded by the viral genome. Competition may be competition for transcription and/or translation machinery in the cell.

In an example the VLP RNA is no greater than 100, 110 or 120% the length of the viral RNA genome (preferably the RNAs are the same length or substantially the same length). In an example the length of the VLP RNA is no greater than 100, 110 or 120% the packaging capacity of the viral capsid. These examples are useful, in case viral particles are made in the host cell, wherein there is chance of the VLP RNA being packaged (it will meet the packaging size limits of the viral capsid), thereby providing further particles that can be released from host cells and immunise other host cells in the subject with the VLP RNA. In this sense, the invention therefore provides prophylactic vaccination of the subject (in addition to treatment of the infection in host cells harbouring viral RNAs), as said further particles harbouring the VLP RNA can recognise new host cells via the spike (or other viral protein used for host cell recognition) whereby VLP RNA is introduced and may be amplified in host cells that have not yet been infected, in readiness in case of subsequent infection by a virus particle.

Where the VLP bears the spike (or other ligand used for host cell recognition usually employed by the virus) and/or virus capsid proteins, this may provide an additional layer of protection for the subject by presenting antigenic epitopes to the immune system of the subject to raise protective antibodies against the virus. Similarly, where VLP RNA is packaged by infected cells to produce further particles as mentioned above, these may also comprise and present such antigenic epitopes when the particles are released from the host cells in the subject.

In an example, the VLP RNA comprises a packaging signal for packaging the RNA into capsids of the virus. In an embodiment, the packaging signal is a packaging signal comprised by the viral genome. In an embodiment, the packaging signal comprised by the VLP RNA is used in the cell in preference to packaging of the viral genome. Beneficially for packaging the VLP RNA, the VLP RNA and the viral RNA may be of the same polarity, eg, each is positive-strand RNA; and optionally the VLP RNA size is from 80-120% (eg, 100%) of the size of the viral RNA genome. A suitable packaging signal may be a packaging signal disclosed for a coronavirus in Masters, Paul. (2019). "Coronavirus genomic RNA packaging", Virology. 537. 10.1016/j.virol.2019.08.031, the disclosure (and explicitly the packaging signal sequences for possible use in the present invention) of which is incorporated herein. In an embodiment, the packaging signal comprise by the VLP RNA is one of these packaging signals or an orthologue or homologue thereof.

Homologue: A gene, nucleotide or protein sequence related to a second gene, nucleotide or protein sequence by descent from a common ancestral DNA or protein sequence. The term, homologue, may apply to the relationship between genes separated by the event of or to the relationship between genes separated by the event of genetic duplication.

Orthologue: Orthologues are genes, nucleotide or protein sequences in different species or strains that evolved from a common ancestral gene, nucleotide or protein sequence by speciation. Normally, orthologues retain the same function in the course of evolution.

In an example, the VLP comprises a single said RNA molecule or a plurality of said RNA molecules.

In an alternative, rather than the VLP comprising a single RNA type, the VLP comprises a plurality of different RNAs, wherein each RNA comprises at least one of said TRS-Bs comprising CE2 or a complement thereof and/or wherein each RNA comprises at least one of said TRS-Ls comprising CE1 or a complement thereof. By splitting the RNA information into several RNAs, it may be possible to provide RNAs that are not packaged by capsids of the virus (if so desired to avoid spreading of VLP RNA in the subject).

In an embodiment, the RNA or none of the different RNAs comprises a packaging signal for packaging into capsids of said virus.

In an example, a VLP RNA comprises a plurality (eg, 2, 3, 4, 5, 6, 7, 8, 9 or 10) of said TRS-Ls comprising CE1 and optionally at least one complement of a TRS-B comprising CE2. In an example, a VLP RNA comprises a plurality (eg, 2, 3, 4, 5, 6, 7, 8, 9 or 10) of complement sequences of a TRS-B comprising CE2 and optionally at least one of said TRS-Ls comprising CE1. In an example, a VLP RNA comprises at least one of said TRS-Ls comprising CE1 and at least one complement of a TRS-B comprising CE2.

Optionally, the VLP RNA comprises a plurality of TRS-B sequences of the viral genome (eg, one or more of the TRS-B sequences of a coronavirus positive-strand RNA) or a plurality of complement sequences of such TRS-Bs. In an example, the VLP RNA is devoid of all exon sequences of the viral genome, but the VLP RNA comprises one or a plurality of TRS-B sequences of the viral genome (eg, one or more of the TRS-B sequences of a coronavirus positive-strand RNA) or a plurality of complement sequences of such TRS-Bs. Being devoid of such sequences minimises the chance of recombination of VLP RNA with the viral RNA where the VLP RNA acquires one or more sequences encoding a viral protein.

The VLP may be a synthetic particle (eg, a liposome or nanoparticle) or an attenuated virus (eg, an attenuated copy of the virus that infects the subject, eg an attenuated coronavirus, SARS-COV or SARS-COV-2 virus). Attenuation here means that the VLP is not capable of causing a pathogenic viral infection in the subject, eg, the VLP is not capable of self-replication. For example, the particle is devoid of any ORF RNA of the virus. An attenuated form of the virus may be useful for such purpose, eg, an attenuated CoV, such as SARS-COV, SARS-COV-2 or MERS-Cov.

In one embodiment, where "VLP" is mentioned, the particle is a "non-self replicatable particle", eg, a particle comprising spike proteins of the virus. Optionally, the VLP is non-self replicative in cells of said subject (eg, in human cells). By "non-self-replicative" it is meant that the VLP does not encode all proteins necessary to replicate itself to produce progeny VLPs in a host cell.

In an embodiment, the VLP is capable of membrane fusion with the host cell for introduction of VLP RNA into the host cell, eg, by endocytosis.

It is known that nucleic acids can be encapsulated into certain VLPs (see, eg, Takamura, S., Niikura, M., Li, T. et al. DNA vaccine-encapsulated virus-like particles derived from an orally transmissible virus stimulate mucosal and systemic immune responses by oral administration. *Gene Ther* 11, 628-635 (2004). https://doi.org/10.1038/sj.gt.3302193, and Lee, E. B., Kim, J., Hur, W. et al. Liver-specific Gene Delivery Using Engineered Virus-Like Particles of Hepatitis E Virus. *Sci Rep* 9, 1616 (2019). https://doi.org/10.1038/s41598-019-38533-7, the disclosures of which are incorporated herein by reference). Thus, in an embodiment the RNA of the invention is encapsulated inside a VLP.

In another embodiment, the RNA is attached to the outer surface of the particles (eg, nanoparticles).

As the skilled addressee knows, VLPs may mimic a version of the virus minus its genetic information (in the present case, the VLP instead comprises the VLP RNA of the invention). Contemporary VLP production may take advantage of several systems, including bacterial, yeast, insect and mammalian cells. The choice of production platform depends on several factors, including cost and the need for post-translational modifications (PTMs), which can be essential in generating an optimal immune response. Some VLP-based vaccines designed to prevent several infectious diseases are already approved and on the market, with many others at the clinical trial or research stage. As is known, baculovirus expression systems are used to produce VLPs for vaccine use, such as the Flashback™ baculovirus expression system. Here, the VLP is an assembly of virus structural proteins that mimics the configuration of the real wild-type virus, except that it contains no complete genetic material of such virus. Conventionally for vaccines, if a person is vaccinated with VLPs then an immune response is generated as if the immune system has been presented with a real wild-type virus. However, as the VLPs do not contain the complete genetic material they are unable to replicate to produce the wild-type virus, and as such do not produce the effects of the wild-type viral infection in a person who has been vaccinated. In order to produce a functional VLP that effectively mimics a real virus, good yields of multiple virus structural proteins are used. These are then be correctly assembled into a particle that reproduces the confirmation of the outer shell (capsid) of the infectious wild-type virus. Advantageously, the expression system used to produce the particles is both safe and capable of producing multiple proteins both on a small scale (for testing) and on a larger scale (for vaccine manufacture). There has been considerable interest in the use of the baculovirus expression system for the production of VLP vaccines. As the FDA has licensed a baculovirus manufactured vaccine for use in humans (Cervarix® by GlaxoSmithKline) to protect against HPV this has now made it possible for the baculovirus system to be used more widely for VLP production. There is also significant interest in using the baculovirus system to produce VLPs that can be used to immunize against the influenza virus.

In an example, the VLP comprises viral capsid proteins and/or spike proteins (eg, S, E, M and N proteins of the virus), wherein the proteins are obtained or obtainable by expression in a cell selected from a bacterial, yeast, insect or mammalian cell. In an embodiment, the proteins are obtained or obtainable by expression in a human lung (eg lung epithelial cell), kidney or heart cell line. In an embodiment, the proteins are obtained or obtainable by expression in a A549 cell line (which is a human lung cell line). In an embodiment, the proteins are obtained or obtainable by expression in a HEK (eg, HEK293) cell line (which is a human kidney cell line). In an embodiment, the proteins are obtained or obtainable by expression in a Vero (eg, Vero E6) cell line. In an embodiment, the proteins are obtained or obtainable by expression in a Vero C1008 (ATCC® CRL-1586™) cell line.

In an alternative configuration, instead of using a VLP, the RNA of the invention is introduced into the subject by DNA vaccination (wherein the DNA encodes the RNA of the invention inside host cells). Alternatively, the RNA may be introduced into the subject, eg, wherein the RNA is protected using conventional techniques used to protect mRNA therapeutics (see, eg, the technology of Moderna, Inc, which will be familiar to the skilled addressee).

The host cell or host cells may be lung cell(s) of the subject, kidney cell(s) of the subject, GI tract cell(s) of the subject or heart cell(s) of the subject.

Preferably, the VLP RNA comprises components (i) (a) and (ii) (b), for example, wherein component (i) (a) is 5' of component (ii) (b) in the VLP RNA.

The virus may be a coronavirus, eg, α, β or γ coronavirus. For example, the virus is transmissible gastroenterities virus (TGEV), mouse hepatitis (MHV) or infectious bronchitis virus (IBV).

CoV genome includes a 5' end CAP and a 3' end poly(A) that may also promote 5' to 3' interactions, mediated by viral and cellular proteins. These interactions may be involved in the timely switches controlling CoV replication and transcription. These activities include the synthesis of minus-strand RNAs associated to double-layered membranes (DMVs). In an example, the VLP RNA comprises a 5' end CAP and a 3' end poly(A), eg, a 5' end CAP and a 3' end poly(A) of said virus.

TABLE 1 shows TRSs of SARS-CoV-2 and CE sequences

| ORF | Location (nt) | Length (nt) | Length (aa) | TRS location | TRS sequence (s) (distance in bases to AUG) |
|---|---|---|---|---|---|
| 1ab | 266-21,555 (shift at13,468) | 21,290 | 7,096 | 64 | CUCUAAACGAACUU(188)<sup>a</sup><u>AUG</u> |
| S | 21,563-25,384 | 3,822 | 1,273 | 21,550 | AACUAAACGAAC<u>AAUG</u> |
| 3a | 25,393-26,220 | 828 | 275 | 25,379 | ACAUAAACGAACUU<u>AUG</u> |
| 3b | 25,765-26,220 | 456 | 151 | | |
| E | 26,245-26,472 | 228 | 75 | 26,231 | AUGAGUACGAACUU<u>AUG</u> |

TABLE 1-continued shows TRSs of SARS-CoV-2 and CE sequences

| ORF | Location (nt) | Length (nt) | Length (aa) | TRS location | TRS sequence(s) (distance in bases to AUG) |
|---|---|---|---|---|---|
| M | 26,523-27,191 | 669 | 222 | 26,467 | GUCUAAACGAACUA(42)[a]<u>AUG</u> |
| 6 | 27,202-27,387 | 186 | 61 | 27,035 | UACAUCACGAACGC(153)[a]<u>AUG</u> |
| 7a | 27,394-27,759 | 366 | 121 | 27,382 | GAUUAACGAAC<u>AUG</u> |
| 7b | 27,756-27,887 | 132 | 43 | | |
| 8 | 27,894-28,259 | 366 | 321 | 27,882 | GCCUAAACGAAC<u>AUG</u> |
| N | 28,274-29,533 | 1,260 | 419 | 28,254 | AUCUAAACGAACAA(6)[a]<u>AUG</u> |
| 9a | 28,284-28,577 | 294 | 97 | | |
| 9b | 28,734-28,955 | 222 | 73 | | |
| 10 | 29,558-29,674 | 117 | 38 | 29,528 | GCCUAAACUCAUGC(16)[a]<u>AUG</u> |

[a]Numbers in parentheses represent the number of nucleotides to the putative start codon. Start codons are underlined. The conserved TRS core sequence, ACGAAC or CUAAAC, is highlighted in bold.

Optionally, (eg, wherein the virus is a coronavirus, such as SARS-COV-2 or SARS-Cov) CE1 or any CE herein is ACGAAC or CUAAAC or CUAAACGAAC (written in 5' to 3' direction). Additionally, or alternatively, (eg, wherein the virus is a coronavirus, such as SARS-COV-2 or SARS-Cov) CE2 is ACGAAC or CUAAAC or CUAAACGAAC (written in 5' to 3' direction); or is a complement thereof. For example, the particle RNA comprises such a sequence or the RNA is transcribable in the host cell to produce an RNA comprising such a sequence.

In an example, CE2 or any CE herein is a CE of a TRS of a S, 3ab, E, M, N or 7-encoding sequence of the viral RNA; or is a complement thereof. In an example, CE2 or any CE herein is comprised by the VLP RNA transcript and CE2 is a CE of a TRS of a S, 3ab, E, M, N or 7-encoding sequence of the viral RNA, and wherein CE2 is not operably connected to an RNA sequence that encodes for S, 3ab, E, M, N or 7 of the virus. For example, the VLP RNA is positive-strand RNA and the transcript is negative-strand RNA and optionally the CE2 in the transcript is immediately 3' of an RNA sequence that does not encode for a protein of the virus, does not encode for a structural protein of the virus, or does not encode for a viral S, 3ab, E, M, N or 7 protein, or does not encode for a S, 3ab, E, M, N or 7 protein of the virus.

In an example, a complement of CE2 is comprised by the VLP RNA and the CE2 complement is comprised by a S, 3ab, E, M, N or 7-encoding sequence of the viral RNA, and wherein the complement comprised by the VLP RNA is not operably connected to an RNA sequence that encodes for S, 3ab, E, M, N or 7 of the virus. For example, the VLP RNA is positive-strand RNA and optionally said complement in the VLP RNA is immediately 5' of an RNA sequence that does not encode for a protein of the virus, does not encode for a structural protein of the virus, or does not encode for a viral S, 3ab, E, M, N or 7 protein, or does not encode for a S, 3ab, E, M, N or 7 protein of the virus.

Optionally, L comprises a transcription regulatory sequence which comprises TRS-CE1 of the virus.

Optionally, the VLP RNA comprises a TRS-L comprising TRS-CE1. In an example, the transcript of the VLP RNA comprises a TRS-B comprising TRS-CE2. For example, the TRS-CE1 is comprised by positive-strand single-strand RNA and the TRS-CE2 is comprised by negative-strand single-strand RNA. Thus, the TRS-CE1 and TRS-CE2 may be 100% complementary to each other.

In an example the reduction of viral replication is at least 20, 30, 40, 50, 60, 70, 80 or 90% compared to viral replication in a control subject of the same species and sex and age as the subject of the invention, wherein the control subject has been infected (eg, with the same amount or a similar amount) with the virus for the same or a similar time as the subject of the invention, but wherein the subject of the invention is administered said VLP(s) and the control subject has not been administered any of such VLPs.

Optionally, the VLP RNA comprises a regulatory element that is operable for protein translation, wherein the regulatory element is operably linked 5' of component (i) (a) or (ii) (b) (or 5' to component (i) or (ii)). For example, the component is comprised by an RNA sequence encoding a leader sequence, optionally the leader comprising the leader sequence of the virus.

Optionally, the VLP RNA (eg, a (+)ss RNA) comprises component (i) or (ii) (eg, component (i) (a) or (ii) (b)) and the VLP RNA is devoid of an RNA sequence that is 3' of said component and that is expressible to produce an amino acid sequence (A) of a protein required for replication, propagation or infectivity of said virus.

In an example, the CE1 of the VLP RNA or any CE herein is comprised by a sequence selected from (written in 5' to 3' direction) CUAAACGAAC, UAAACGAAC, UCUAAACGAAC, <u>ACGAAC</u>, UAAACGAACUU and ACGAACUU (underline indicates the core element (CE)). Alternatively, the VLP RNA is transcribable (or transcribed) in a host cell to produce an RNA that comprises such a sequence, or a complement (eg, a 100% complement) of the VLP RNA comprises such a sequence. Optionally the virus here is a CoV, eg, a SARS-COV or SARS-Cov2 virus.

Optionally, the CE1 is, in 5' to 3' direction, ACGAAC and/or CE2 is, in 5' to 3' direction, GUUCGU.

Optionally, the VLP RNA comprises multiple copies of TRS-CE complements that each is capable of hybridising to TRS-CE1 in a host cell, wherein none of said copies of is operably connected to an RNA sequence of the VLP RNA that encodes a protein that is essential for replication or propagation (eg, release from host cells or infection of host cells) of the virus.

Optionally, the VLP RNA is capable of replication in host cells using a host or viral replicase.

Optionally, the VLP RNA comprises a regulatory element required for recognition and binding by a RNA-dependent RNA polymerase (RdRP) encoded by the viral genome; optionally wherein the regulatory element is identical to a regulatory element comprised by the viral genome.

Optionally, the VLP RNA comprises a packaging signal that is capable of being recognised by the viral packaging machinery to package VLP RNA into viral capsids that are capable of infecting host cells. Optionally, the packaging signal is the packaging signal of the virus. Optionally, the packaging signal comprise or encodes a loop motif 5'-UUUCGU'3'. In an example, the packaging signal is any packaging signal disclosed in Virology. 2019 November; 537:198-207. doi: 10.1016/j.virol.2019.08.031. Epub 2019 Aug. 30, "Coronavirus genomic RNA packaging", Masters PS (eg, as disclosed in FIG. 2), or any homologue thereof. All sequences in this reference are incorporated herein by reference for use in the present invention. In an example, the virus of the invention is a virus disclosed in this reference and packaging signal is the packaging signal of this virus.

Optionally, the VLP RNA comprises one or more (eg, one or two) nuclear localisation signals operable in the host cell. For example, a NLS is 5' of the sequence encoding the leader or CE1 of the VLP RNA and/or a NLS is 3' of the sequence of the VLP RNA that is complementary to CE2.

Optionally, the VLP RNA of the RNA hybrid produced any of (iii) to (vi) is capable of being 3' extended by the host cell to produce an RNA product, wherein said RNA product is non-productive in the cell for expression of a protein required for replication, propagation or infectivity of said virus.

Optionally, the VLP comprises a receptor or ligand for the host cell that is identical to the receptor or ligand that the virus uses to bind to the host cell; optionally wherein the ligand is a viral spike glycoprotein and/or the ligand is capable of binding to a ACE2 protein on the surface of the host cell (eg, wherein the virus is a SARS-COV or SARS-COV-2 virus) or DPP4 protein on the surface of the host cell (eg, wherein the virus is a MERS-COV virus). In an example, the ligand is a VLP surface-exposed ligand comprised by a capsid of the VLP or lipid envelope of the VLP (if the VLP comprises a lipid envelope).

Optionally, the replication of the virus comprises the transcription of first and second sub-genomic RNAs (sgRNA), wherein each sgRNA comprises a second transcription regulatory sequence core element (TRS-CE) wherein each TRS-CE of the sgRNAs is capable of hybridising to the sequence of VLP RNA TRS-CE1 in a host cell.

Optionally, the RNA genome of the virus is a plus-strand RNA genome and the VLP RNA is a plus-strand RNA. For example, the RNA genome of the virus is a single-stranded, plus-sense RNA. In an alternative, the RNA genome is a positive-sense RNA genome. Optionally both the RNA of the virus and the VLP are positive-strand single-strand RNAs.

For example, the VLP RNA is replicable in the host cells to produce negative-strand complementary RNA thereof. For example, the VLP RNA is positive-strand single-strand RNA and the VLP RNA is replicable in the host cells to produce negative-strand single-strand RNA.

Optionally, the TRS-CE1 is from 6 to 12 consecutive nucleotides and/or TRS-CE2 is from 6 to 12 consecutive nucleotides. Preferably, TRS-CE1 is 6 consecutive nucleotides and/or TRS-CE2 is 6 consecutive nucleotides. Preferably, TRS-CE1 is 6, 7, 8, 9, 10, 11 or 12 consecutive nucleotides. Preferably, TRS-CE2 is 6, 7, 8, 9, 10, 11 or 12 consecutive nucleotides.

Optionally, the VLP RNA comprises an RNA sequence that is 100% complementary to CE2 and wherein said RNA sequence is identical to CE1 of the virus.

Optionally, the sequence of CE2 is 100% complementary to CE1; or CE2 is complementary to CE1 over all of the nucleotides of CE2 except 1, 2 or 3 nucleotides.

Optionally, the TRS-CE1 is comprised by a viral Transcription Regulatory Sequence (TRS1) of from 8 to 30 (eg, from 8 to 25) consecutive nucleotides and/or TRS-CE2 is comprised by a viral TRS (TRS2) of from 8 to 30 consecutive nucleotides. For example, TRS1 comprises or consists of 13, 15, 18 or 26 consecutive nucleotides. For example, TRS1 comprises or consists of 8, 9, 10, 11, 12, 13, 14, 15, 16, 17, 18, 19, 20, 21, 22, 23, 24, 25 or 26 consecutive nucleotides.

Optionally, the TRS1 or any other TRS herein comprises the sequence, in 5' to 3' direction, NNN-CE1 (ie, the last nt of CE1 is the last nt of TRS1) or NNN-CE1-NNN, wherein each N is any nucleotide selected from A, U, C and G; optionally wherein CE1 is, in 5' to 3' direction, ACGAAC.

Optionally, the TRS1 or any other TRS herein comprises, in 5' to 3' direction, UAA-CE1, UCUCUAA-CE1, AGU-CE1 or UGAGU-CE1.

Optionally, the TRS1 or any other TRS herein comprises, in 5' to 3' direction, CE1-UU, CE1-UUU, CE1-UAA, CE1-UAACU, CE1-UAAAU or CE1-UU (ie, last U is the last nt of TRS1).

Optionally, the TRS1 or any other TRS herein comprises, in 5' to 3' direction, UAA-CE1-UU, UAA-CE1-UUU, UCU-CUAA-CE1-UUU, GGUCUAA-CE1-UAACU, GGUC-UAA-CE1-UAAAU, AGU-CE1-UU or UGAGU-CE1-UU.

Optionally, the TRS2 or any other TRS herein comprises the sequence, in 5' to 3' direction, NNN-CE2 (ie, the last nt of CE2 is the last nt of TRS2) or NNN-CE2-NNN, wherein each N is any nucleotide selected from A, U, C and G; optionally wherein CE2 is, in 5' to 3' direction, ACGAAC.

Optionally, the TRS2 or any other TRS herein comprises, in 5' to 3' direction, UAA-CE2, UCUCUAA-CE2, AGU-CE2 or UGAGU-CE2.

Optionally, the TRS2 or any other TRS herein comprises, in 5' to 3' direction, CE2-UU, CE2-UUU, CE2-UAA, CE2-UAACU, CE2-UAAAU or CE2-UU (ie, the last U is the last nt of TRS2).

Optionally, the TRS2 or any other TRS herein comprises, in 5' to 3' direction, UAA-CE2-UU, UAA-CE2-UUU, UCU-CUAA-CE2-UUU, GGUCUAA-CE2-UAACU, GGUC-UAA-CE2-UAAAU, AGU-CE2-UU or UGAGU-CE2-UU.

Optionally, the virus replicates using a discontinuous RNA transcription process. Thus, the virus in the invention may replicate using a discontinuous RNA transcription process comprising hybridizing of a first viral RNA with a second viral RNA, wherein the first RNA comprises a TRS-L that comprises a first core element (CE1) and the second RNA comprises a TRS-B that comprises a second core element (CE2) and said hybridizing comprises hybridization of CE1 with CE2. Optionally, the first RNA is a (+)ssRNA and the second RNA is a (−) ssRNA and the (+) RNA strand hybrid of the RNAs in the process is elongated in the 5' to 3' direction to produce a mRNA encoding viral proteins that are required for virus replication and infectivity.

Optionally, the virus is a Nidovirus; Coronaviridae virus; Coronavirinae, Arterivirus, Okavirus or Torovirinae virus, preferably a Coronavirinae; SARS or MERS virus; or SARS-COV, SARS-COV-2 or MERS-COV virus.

Optionally, the virus is a EAV, equine arteritis virus; IBV, infectious bronchitis virus; MERS-CoV, Middle East respiratory syndrome coronavirus; MHV, mouse hepatitis virus; PRRSV, porcine reproductive and respiratory syndrome virus; SARS-COV, severe acute respiratory syndrome coronavirus; or TGEV, transmissible gastroenteritis virus.

Optionally, the virus is a Coronavirus, eg, SARS-Cov, SARS-Cov-2, a SARS-related coronavirus (a SARSr-Cov), HCoV-OC43, HCoV-HKU1, HCoV-NL63, HCoV-229E. In an example, the virus is SARS-COV ZXC21, ZC45, RaTG13, CUHK-W1, Urbani, GZ02, A031, A022, WIV16, WIV1, Rp3, Rs672 or HKU4. In an example, the virus is selected from SARS-COV-2 (YP_009724390.1), SARSr-CoV RaTG13 (QHR63300.2), SARS-COV Urbani (AAP13441.1), SARS-CoV CUHK-W1 (AAP13567.1), SARS-COV GZ02 (AAS00003.1), SARS-COV A031 (AAV97988.1), SARS-COV A022 (AAV91631.1), WIV-16 (ALK02457.1), WIV-1 (AGZ48828.1), SARS-COV ZXC21 (AVP78042.1), SARSr-CoV ZC45 (AVP78031.1), SARS-COV Rp3 (Q315J5.1), SARSr-CoV Rs672 (ACU31032.1). Accession numbers are shown in brackets; the sequences thereof are explicitly incorporated herein by reference for use in the present invention.

Optionally, the virus is a (−) ssRNA virus, eg, a Negarnaviricota or Deltavirus virus, eg, a hepatitis D virus; and in an embodiment the particle RNA of the invention is a (−) ssRNA. In an example, the virus is an Arenaviridae, Orthomyxoviridae, Paramyxoviridae, Pneumoviridae, Bunyaviridae, Rhabdoviridae or Tenuivirus virus. Optionally the virus is a Marburg virus, Ebola virus, measles virus, mumps virus, rabies virus or influenza virus, such as when the subject is a human.

Alternatively, the subject may be a vertebrate, arthropod or a plant.

There is also provided:

A composition comprising a plurality of the particles or VLPs.

Optionally, the composition is for administration to a human or animal subject to treat or reduce the risk of an infection of the subject by the virus, or to treat or reduce the risk of a symptom of infection of the subject by the virus. For example, the symptom is an inflammatory response of the subject to the virus. For example, the symptom is inflammation in the subject. Optionally, the composition comprises a steroid and/or a further anti-viral agent that is functional to reduce replication, propagation or infection of said virus.

Optionally, the composition is comprised by an inhaler or nebuliser.

There is also provided:

A method for treating or reducing the risk of an infection of a human or animal subject by a virus, the method comprising administering the composition to the subject.

There is also provided:

A method for treating or reducing the risk of a symptom (eg, inflammation) of an infection of a human or animal subject by a virus, the method comprising administering the composition to the subject.

There is also provided:

A method (eg, in vitro or in vivo in a subject) of inhibiting replication of a virus in a host cell, wherein the virus comprises an RNA genome, the method comprising a) contacting the host cell with a VLP as described herein and introducing the VLP RNA into the host cell;
b) simultaneously to step (a), subsequent to step (a) or before step (a) the viral RNA genome is introduced into the host cell; and
a transcription process is carried out wherein the VLP RNA is transcribed to produce a transcript comprising TRS-CE2, and the VLP RNA (or a copy thereof) comprises TRS-CE1 which hybridises to TRS-CE2, wherein the process produces a mRNA comprising a sequence (L) (optionally encoding a leader peptide) wherein L comprises TRS-CE1, wherein the leader is not operably linked to an RNA sequence encoding an amino acid sequence (A), wherein A is the amino acid of a protein required for replication, propagation or infectivity of said virus.

Optionally, the TRS-CE2 in the transcript is immediately 3' of an RNA sequence encoding a protein that is not required for replication, propagation or infectivity of said virus; or the transcript is immediately 3' of an RNA sequence that does not encode an open reading frame (ORF).

Optionally, the transcript is negative-strand single-strand RNA and the virus RNA is positive-strand single-strand RNA.

Genomic leader-encoding sequences of SARS-COV viruses may be obtained from GenBank accession numbers listed below: GZ02, AY390556; HZS2-Bb, AY395004; ZS-C, AY395003; CUHK-LC5,AY395002; CUHK-LC4, AY395001; CUHK-LC3, AY395000; CUHK-LC2, AY394999; ZS-A, AY394997; ZS-B, AY394996; HSZ-Cc, AY394995; HSZ-Bc, AY394994; HGZ8L2, AY394993; HZS2-C, AY394992; HZS2-Fc, AY394991; HZS2-E, AY394990; HZS2-D, AY394989; JMD, AY394988; HZS2-Fb, AY394987; HSZ-Cb, AY394986; TW3, AY502926; BJ04, AY279354; HGZ8L1-A, AY394981; HGZ8L1-B, AY394982; ZS-C, AY395003; HSZ2-A, AY394983; GZ-C, AY394979; Tor2, NC_004718; BJ01, AY539954; WHU, AY394850; NS-1, AY508724; TW10, AY502923; TW2, AY502925; ShanghaiQXC1, AY463059; ZJ01, AY286320; ShanghaiQXC2, AY463060; GD69, AY313906; FRA, AY310120; SoD, AY461660; Sino1-11, AY485277; CUHK-AG03, AY345988; CUHK-AG02, AY345987; CUHK-AG01, AY345986; CUHK-Su10, AY282752; PUMC03, AY357076; PUMC02, AY357075; PUMC01, AY350750; GZ50, AY304495; SZ16, AY304488; SZ3, AY304486; AS, AY427439; HSR 1, AY323977; Sin2774, AY283798; HKU-39849, AY278491; GD01, AY278489; TWC2, AY362698; Sin2748, AY283797; Sin2679, AY283796; Urbani, AY278741; ZMY 1, AY351680; TWY, AP006561; TWS, AP006560; CUHK-W1, AY278554; TC3, AY348314; TC2, AY338175; TC1, AY338174; TWC, AY321118; Frankfurt 1, AY291315; Sino3-11, AY485278; BJ03, AY278490; BJ02, AY278487; ZJ01, AY297028; TW1, AY291451, which sequences and the sequences of the leader, TRS and TRS-CE sequences thereof are explicitly incorporated herein by reference for use in the present invention.

VLPs can be produced encapsulating just one design of RNA (eg, Design 1 from Example 1) or 2, 3 or more of the designs (eg, wherein each VLP comprises one type of RNA design). In this instance, a mixture of different VLPs is produced and this may be useful for evading any resistance developed by viruses to the RNAs in the subject or generally in a human or animal population.

In an embodiment, first VLPs can be produced encapsulating just one design of RNA (eg, Design 1), and second VLPs can be produced encapsulating just one design of RNA (eg, Design 2) which is different from the design used for the first VLPs. The first VLPs can be administered simultaneously or sequentially with the second VLPs to a subject suffering from or at risk of a CoV, eg, SARS-CoV2 or SARS-Cov infection. Administration may be administration to the lung.

In an example, each CE of the invention is comprised by a TRS sequence shown in Table 3 below. In an example, the VLP RNA comprises 1, 2, 3, 4, 5, 6, 7, 8, 9, 10, 11, 12 or more sequences for encoding a respective mRNA, wherein each sequence comprises a TRS as disclosed herein, eg, a TRS sequence shown in Table 3. For example, the particle RNA comprises such a sequence, or a complement (eg, a 100% complement) of the particle RNA comprises such a sequence, or the particle RNA is transcribable (or transcribed) in a host cell to produce a transcript comprising such a sequence. Optionally, each sequence is operatively connected to a respective promoter for expression of the sequence in a host cell. Optionally one or more or all of the promoters is a U6 promoter.

In an embodiment, the particle or composition of the method is capable of reducing replication of different viruses. For example, the viruses are viruses comprising the same CE (eg, TRS-L CE and/or TRS-B CE). For example, the viruses are CoV viruses, eg, a first virus is a SARS-COV and the another virus is a SARS-Cov-2. For this purpose, advantageously, the particle RNA may comprise a TRS sequence (or 2, 3, 4 or more such sequences) shown in Table 2 of Example 1. Alternatively, advantageously for this purpose the particle RNA may be transcribable (or transcribed) in a host cell to produce an RNA comprising a sequence (or 2, 3, 4 or more such sequences) shown in Table 2. As shown in Example 1, in all cases bar one, a comparison of the TRS sequences remarkably show identity between SARS-Cov and SARS-Cov-2 TRSs associated with each ORF, and in the excepted case there is identity except at one position. Thus, the inventor has realized that utility of these sequences in a RNA of the invention for producing a particle or composition or method that can reduce the replication of either of these viruses. Thus, in another example, advantageously for this purpose the particle RNA may comprise or be transcribable (or transcribed) in a host cell to produce an RNA comprising a sequence (or 2, 3, 4 or more such sequences) selected from 5'-ACGAAC-3' and 5'-GUUCGU-3'. For example, the particle RNA is a (+)ss RNA comprising 1, 2, 3, 4, 5, 6, 7, 8, 9 or 10 sequences, wherein each sequence comprises 5'-ACGAAC-3'; and optionally the virus is a (+)ss RNA, such as a CoV, whose RNA genome comprises one or more 5'-ACGAAC-3' sequences. For example, the particle RNA is transcribable (or transcribed) in a host cell to produce a (+)ss RNA comprising 1, 2, 3, 4, 5, 6, 7, 8, 9 or 10 sequences, wherein each sequence comprises 5'-ACGAAC-3'; and optionally the virus is a (+)ss RNA, such as a CoV, whose RNA genome comprises one or more 5'-ACGAAC-3' sequences. For example, the particle RNA is transcribable (or transcribed) in a host cell to produce a (−) ss RNA comprising 1, 2, 3, 4, 5, 6, 7, 8, 9 or 10 sequences, wherein each sequence comprises 5'-GUUCGU-3'; and optionally the virus is a (+)ss RNA, such as a CoV, whose RNA genome comprises one or more 5'-ACGAAC-3' sequences. For example, the particle RNA is a (−) ss RNA comprising 1, 2, 3, 4, 5, 6, 7, 8, 9 or 10 sequences, wherein each sequence comprises 5'-GUUCGU-3'; and optionally the virus is a (+)ss RNA, such as a CoV, whose RNA genome comprises one or more 5'-ACGAAC-3' sequences. The 5'-ACGAAC-3' may be comprised by a TRS sequence disclosed in Table 1 or 2. The 5'-GUUCGU-3' may be comprised by a 100% complement of a TRS sequence disclosed in Table 1 or 2. The invention also provides RNAs per se whether or not comprised by a particle, as explained below. Such RNAs may be according any RNA disclosed in this paragraph or in relation to a VLP RNA herein.

In an example, the VLP RNA is from 50-150 or 80 to 120% (preferably 90-110%) or 100% of the size of the RNA genome of the virus and the VLP RNA is obtained or obtainable by replacing some or all of the sequence of each ORF of the viral RNA with an RNA sequence that is from 50-150 or 80 to 120% (preferably 90-110%) or 100% the size of the ORF sequence that it replaces, wherein each ORF of the virus is rendered non-functional but the TRS sequences of the viral RNA are retained in the VLP RNA. In an alternative just the ORFs of the S, M, E and N genes are so replaced with RNA sequence. The RNA sequence used to replace an ORF may be non-viral sequence or may encode a protein that is useful for inhibiting viral replication, propagation or infection (such as an anti-viral agenda, eg, an interferon).

RNAs, DNAs & Compositions

In a configuration, there is a provided an RNA (which may or may not be comprised by a VLP or other particle) that is an RNA of the invention, or a complement or transcript thereof. For example, it may be an RNA transcript of an RNA comprised by a particle of the invention. For example, the viral genome RNA is a ssRNA and the RNA of the invention is a ssRNA of the same sense (positive or negative) as the sense of the viral genome ssRNA.

In an example, there is provided an RNA that comprises a sequence that is a 100% complement of an RNA of the invention (ie, the sequence of the complement is complementary to the other RNA at each position along its length). In an example, there is provided an RNA that comprises a sequence that is complementary to an RNA of the invention at no less than 80, 90, 95, 96, 97, 98 or 99% of its positions along its length.

In an example, there is provided an RNA that comprises a sequence that is a 100% complement of a sequence of an RNA of the invention (ie, the sequence of the complement is complementary to the other RNA sequence at each position along its length), wherein the sequence of the RNA of the invention comprises said CEs or TRSs (or the complements thereof). In an example, there is provided an RNA that comprises a sequence that is complementary to an RNA sequence of an RNA of the invention at no less than 80, 90, 95, 96, 97, 98 or 99% of its positions along its length, wherein the sequence of the RNA of the invention comprises said CEs or TRSs (or the complements thereof).

In an example, an RNA herein is a (+)ssRNA; or a (−) ssRNA. In an example an RNA herein is a (+)ssRNA for administration to a human or animal subject for treating or preventing a viral infection in the subject, wherein the virus is a (+)ssRNA virus. In an example an RNA herein is a (−) ssRNA for administration to a human or animal subject for treating or preventing a viral infection in the subject, wherein the virus is a (−) ssRNA virus.

In another configuration, there is provided a DNA that encodes an RNA as described herein. Optionally, the DNA is comprised by a VLP or other particle, eg, comprised by a nanoparticle or liposome, that is capable of introducing the DNA into a cell for transcription thereof in the cell to produce an RNA transcript thereof, such as an RNA of the invention. For example, the RNA transcript is any RNA as disclosed herein, eg, a (+)ssRNA as described herein. In an example, the DNA is a single-stranded DNA or double-stranded DNA. In an example, the DNA is a ssDNA complement (eg, an at least 80, 90, 56 or 99% complement, or a 100% complement) of an RNA as described herein (eg, a (+)ssRNA or a (−) ssRNA). In an example, the DNA is a ssDNA complement (eg, an at least 80, 90, 56 or 99% complement, or a 100% complement) of a ssDNA that encodes an RNA as described herein (eg, a (+)ssRNA or a (−) ssRNA). In an example, the DNA encodes a (+)ssRNA; or a (−) ssRNA. In an example the DNA encodes a (+)ssRNA for administration to a human or animal subject for treating or preventing a viral infection in the subject, wherein the virus is a (+)ssRNA virus. In an example the DNA encodes a (−) ssRNA for administration to a human or animal subject for treating or preventing a viral infection in the subject, wherein the virus is a (−) ssRNA virus. Optionally, a RNA or DNA herein is administered (or for administration) to a human or animal subject respectively by RNA or DNA injection into the patient, eg, using a gene gun.

Administration of any DNA or RNA herein to a subject may be by administering to the subject a delivery vehicle, eg, selected from liposomes, particles, exosomes, microvesicles and viral vectors. For example, reference is made to WO2016165825A1 for examples of suitable particles and methods of manufacture, the descriptions of which are incorporated herein for use in the invention.

The DNA of the invention may be comprised by an expression vector, wherein the vector comprises a promoter for transcription of the DNA to produce an RNA transcript thereof. Such transcription may be in a host cell (eg, a human cell, such as a lung, kidney or heart cell) of the subject to produce an RNA of the invention. In an alternative, such transcription may be in a producer cell line (eg, a human cell line, such as a lung, kidney or heart cell line), wherein the producer cell line produces a plurality of RNAs of the invention.

In an example, the invention provides a method of producing a plurality of particles, the method comprising combining a plurality of particles (eg, VLPs, liposomes, nanoparticles, exosomes or microvesicles) with a plurality of RNAs of the invention (eg, wherein the RNAs are identical), wherein at least one RNA is incorporated in and/or on a respective particle of the plurality of particles; and optionally formulating the particles to produce a pharmaceutical composition for administration to a human or animal subject to treat or prevent viral infection. In an example, the invention provides a method of producing a plurality of particles formed from one or more types of protein (such as structural proteins of a virus, eg, viral capsid and/or spike proteins, eg, S, M and E (and optionally also N) proteins), the method comprising forming said proteins into a plurality of particles (eg, VLPs, liposomes, nanoparticles, exosomes or microvesicles) in the presence of a plurality of RNAs of the invention (eg, wherein the RNAs are identical), wherein at least one RNA is incorporated in and/or on a respective particle of the plurality of particles; and optionally formulating the particles to produce a pharmaceutical composition for administration to a human or animal subject to treat or prevent viral infection. Optionally, there is provided such a composition obtained or obtainable by the method. An alternative composition comprises a plurality of DNAs or RNAs as described herein, eg, naked DNAs or RNAs for administration to the subject using a gene gun. In an alternative, DNAs as described herein are used instead of the RNAs in the methods.

For example, the composition is comprised by a medicament administration device or container, such as an inhaler, an IV bag, a syringe or an injection pen. In an example, the composition comprises a diluent, excipient or carrier. An example carrier is an inhalant carrier, wherein the composition is for administration to the subject by inhalation for treating or preventing viral infection. In an example, the composition further comprises a steroid. In an example, the composition further comprises an anti-inflammatory agent (eg, a NSAID, such as a corticosteroid). In an example, the composition further comprises an anti-viral agent, eg, an interferon (such as an alpha- or beta-interferon).

In an example, the anti-viral agent is selected from:

Abacavir
Acyclovir (Aciclovir) (eg, Use for herpes e.g. Chicken pox)
Adefovir (eg, Use for Hepatitis B)
Amantadine (eg, Use for influenza)
Ampligen
Amprenavir (Agenerase) (eg, Use for HIV)
Arbidol
Atazapavir
Atripla
Balavir
Baloxavir marboxil (Xofluza)
Biktarvy
Boceprevir (Victrelis)
Cidofovir
Cobicistat (Tybost)
Combivir
Daclatasvir (Daklinza)
Darunavir
Delavirdine
Descovy
Didanosine
Docosanol
Dolutegravir
Doravirine (Pifeltro)
Ecoliever
Edoxudine
Efavirenz
Elvitegravir
Emtricitabine
Enfuvirtide
Enecavir
Etravirine (Intelence)
Famciclovir
Fixed dose combination (an antiretroviral)
Fomivirsen
Fosamprenavir
Poscarnet
Fosfonet
Fusion inhibitor
Ganciclovir (Cytovene)
Ibacitabine
Ibalizamab (Trogarzo)
Idoxuridine
Imiquimod
Imonovir
Indinavir
Inosine
Integrase inhibitor
Interferon type I
Interferon type II
Interferon type III
Interferon
Lamivudine
Letermovir (Prevymis)
Lopinavir
Loviride
Maraviroc
Methisazone
Moroxydine
Nelfinavir
Nevirapine
Nexavir
Nitazoxanide
Norvir
Nucleoside analogues
Oseltamivir (Tamiflu)
Peginterferon alfa-2a
Peginterferon alfa-2b
Penciclovir
Peramivir (Rapivab)

-continued

Pleconaril
Podophyllotoxin
Protease inhibitor (pharmacology)
Pyramidine
Raltegravir
Remdesivir
Reverse transcriptase inhibitor
Ribavirin
Rilpivirine (Edurant)
Rimantadine
Ritonavir
Saquinavir
Simeprevir (Olysio)
Sofosbuvir
Stavudine
Synergistic enhancer (an antiretroviral)
Telaprevir
Telbivudine (Tyzeka)
Tenofovir alafenamide
Tenofovir disoproxil
Tenofovir
Tipranavir
Trifluridine
Trizivir
Tromantadine
Truvada
Valaciclovir (Valtrex)
Valganciclovir
Vicriviroc
Vidarabine
Viramidine
Zalcitabine
Zanamivir (Relenza)
Zidovudine The invention also provides a method of detecting virus RNA in a sample, wherein the virus replicates using a discontinuous RNA transcription process comprising hybridizing of a first TRS-CE (eg, CE1) with a second TRS-CE (eg, CE2), the method comprising contacting the sample with a RNA of the invention and detecting a hybrid formed between the RNA of the invention and a virus RNA comprised by the sample. Optionally, the method comprises detecting the presence of a hybrid of the RNA of the invention with a (+)ss RNA genome of the virus, a mRNA of the virus, a sgRNA of the virus or a (−) ssRNA of the virus. Optionally, the method comprises carrying out a method of detecting as described herein using a sample (eg, a blood sample) of the subject.

In an example, the method is a method for diagnosing infection of the virus in a human or animal subject from which the sample has been obtained.

The invention provides: Use of any RNA of the invention described herein for diagnosing a viral infection in a human or animal subject, wherein the virus replicates using a discontinuous RNA transcription process. Optionally, the use comprises detecting the presence of a hybrid of the RNA of the invention with an RNA of the virus (eg, the (+)ss RNA genome of the virus, a mRNA of the virus, a sgRNA of the virus or a (−) ssRNA of the virus). Optionally, the use comprises carrying out a method of detecting as described herein using a sample (eg, a blood sample) of the subject.

Detection may be carried out by detecting a label comprised by or attached to the RNA of the invention. The RNA of the invention may be immobilized on a solid support (eg, a plate or on a bead, such as a magnetic bead), as will be familiar to the skilled addressee with knowledge of testing or assays. The skilled addressee will also be familiar with suitable labels and tags, such as fluorescence tags, RNA tags (eg, RNA barcodes), chemical labels, radioisotope labels or other labels. In an example, the detection method is an ELISA assay. The detection of the label (eg, fluorescent label) may comprise determining the amount of the label in the sample and/or may comprise comparing the amount of the label in the sample with a reference amount determined using a positive control comprising viral RNA that is hybridized to RNA of the invention that is labeled with the same label.

A suitable sample may be a sample comprising cells obtained from a human or animal subject, eg, blood, oral cavity, vaginal, nasal, lung, kidney or heart cells; or epithelial or mucosal cells of the subject. Preferably the cells are human epithelial or mucosal cells, eg, mouth or throat cells of the human, such as obtained using a swab. In an example, the sample is a blood, serum, sputum or saliva sample. For example, the virus is a coronavirus and the sample is a sputum sample. For example, the virus is a coronavirus and the sample is a lung cell sample. For example, the virus is a coronavirus and the sample is a oral cavity cell sample. For example, the virus is a coronavirus and the sample is a mouth cell sample. For example, the virus is a coronavirus and the sample is a throat cell sample. The method or use may comprise obtaining the viral RNA from the sample, eg, by lysing host cells comprised by the sample, which may be performed before the sample is contacted with the labeled or tagged RNA of the invention.

Instead of hybridizing an RNA of the invention with viral RNA in the method or use, alternatively a DNA of the invention may be hybridized to the viral RNA, eg, wherein the DNA is immobilized on a solid support. In an example, the viral RNA is (+)ssRNA and the DNA is (−) ssDNA. In another example, the viral RNA is (−) ssRNA and the DNA is (+)ssDNA.

(+)ssRNAs

The invention also provides an isolated RNA that is identical to a particle or VLP RNA disclosed herein. There is also provided a plurality of such RNAs, wherein the RNAs are identical. Alternatively, the plurality comprises first and second such RNAs that are different from each other. The plurality of RNAs may be comprised by a composition, such as a pharmaceutical composition disclosed herein or a composition for use in the diagnosing or detecting method or use.

A configuration of the invention provides:

A positive-strand single-stranded RNA ((+)ssRNA), wherein the RNA comprises one or more (eg, 1, 2, 3, 4, 5, 6, 7, 8, 9, 10, 11, 12, or more) sequences each of which is a (i) Transcription Regulatory Sequence Core Element (TRS-L CE) sequence of a virus having a (+)ssRNA genome (eg, any such virus disclosed herein, such as a CoV) or (ii) a complement sequence (CS) of a TRS-B CE of the virus, wherein the RNA is devoid of one, more or all open-reading frame (ORF) sequences of the virus or their complement sequences.

In an example, each CE of (i) is comprised by a TRS-L sequence. In an example, each CS of (ii) is comprised by a complement of a TRS-B sequence. In an example, the 5'-most of said sequences is a TRS-L sequence and each of the other sequences is a complement of a TRS-B sequence of the virus.

When in a host cell, such as described above, a CE of (i) is capable of hybridizing to a TRS-B CE of a (−) ssRNA. Where this TRS-B is comprised by a (−) ssRNA complement strand produced in the life-cycle of the virus, the CE of (i) when in the RNA of the invention may be non-functional for initiation of transcription and/or translation as described above, thereby being non-functional for expression of a viral protein required for replication of the virus. This, therefore, provides competition with the virus for negative strands, transcription and translation as explained above. Thus, viral replication is reduced.

When in a host cell, such as described above, a CS of the (+)ss RNA of the invention is capable of being transcribed in a (−) ssRNA transcript comprising a CE that is capable of hybridizing to a TRL-CE of a (+)ssRNA of the virus. This hybrid will be non-functional for production of an ORF protein product of the virus. This, therefore, provides competition with the virus for positive strands, transcription and translation as explained above. Additionally, any expressed, truncated or otherwise defective version of viral protein may compete with wild-type viral protein, leading to defective or non-productive virus production in the host cell. Thus, viral replication is reduced.

Another configuration provides:

A (+)ssRNA (optionally, an RNA as described in the immediately preceding paragraph) comprising a plurality of sequences each comprising a complement sequence (CS) of a TRS-B CE of a virus, wherein the RNA is devoid of one, more or all open-reading frame (ORF) sequences of the virus.

Here, the virus is a (+)ssRNA genome virus and each CS is a complement of a TRS-B CE comprised by a (−) ssRNA that is complementary to the (+)ssRNA viral genome. In an example, the complementarity between each CS of the RNA of the invention is compared over an number of consecutive nucleotides of the CE the TRS-B CE (eg, compared over an identical length of at least 6 consecutive nucleotides, such as 6, 7 or 8 consecutive nucleotides).

Optionally, each CS is 100% complementary to a TRS-B CE sequence of the virus, or 100% complementary except at 1, 2 or 3 (preferably 1) nucleotide positions.

The virus (+)ssRNA genome comprises a TRS-Leader (TRS-L) sequence, wherein the TRS-L comprises a CE, and the virus has a life-cycle comprising transcription to produce mRNAs in a process in which the TRS-L CE hybridises with a second CE, wherein the second CE is comprised by a TRS-Body (TRS-B) sequence, wherein the TRS-B is comprised by a (−) ssRNA that is a complement of the (+)ssRNA of the virus and wherein each mRNA comprises an ORF. As the skilled addressee knows, an ORF encodes a protein product.

Preferably, each CE or CS of the (+)ssRNA of the invention is immediately 5' of an RNA sequence encoding a truncated (eg, C-terminally truncated) or mutated ORF of the (+)ssRNA of the virus. For example, the RNA sequence is truncated compared to the entire corresponding ORF of the viral (+)ssRNA, and comprises (a) the first 5, 10, 15, 20, 25, 30, 35, 40, 45, 50, 80, 100 or 150 consecutive nucleotides (ie, the 5'-most nucleotides) of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire S ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire E ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire M ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire N ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. The feature (a) may be useful to preserve the native viral TRS/ORF sequence junction for proper transcription and/or translation of this part of the RNA of the invention, eg, in a cell. The truncated or mutated sequence may be translated into a correspondingly mutated or truncated form of the protein that is encoded by the viral ORF (eg, to form a truncated or mutated S, E, M or N) which is not functional for viral replication, propagation or infectivity. In this way, the RNA of the invention is not self-replicable in a host cell to form a virus particle. This may be useful for containment purposes, so that production of viral particles is not possible.

In an example of the RNA of the invention, a first (5'-most) CS is a complement (eg, a 100% complement) of a CE comprised by a TRS-Leader (TRS-L) sequence of the virus. Alternatively, the first CS is a complement of a CE comprised by a TRS-Body (TRS-B) sequence of the virus.

Preferably, complement herein may be a 100% complement of another sequence. In an alternative the complement may be completely complementary to the other sequence (eg, other CE) except at 1, 2 or 3 nucleotide positions, eg, a CE sequence 5'-ACGAAC-3' is 100% complementary to a sequence 5'-GUUCGU-3'; whereas 5'-ACGAAC-3' is complementary to a sequence 5'-UUUCGU-3' (eg, when in a host cell, such as a human cell) but the sequences are not 100% complementary to each other.

In an example,
(a) the (+)ssRNA of the invention comprises in 5' to 3' direction a first CS and a second CS, wherein the first CS is a CE comprised by a TRS-L of the virus, and the second CS is a complement of a CE comprised by a first TRS-B of the virus, wherein the virus is a (+)ssRNA virus; and optionally the (+)ssRNA of the invention comprises a third CE which is a complement of a CE comprised by a second TRS-B of the virus;
(b) the (+)ssRNA of the invention comprises in 5' to 3' direction a first CS and a second CS, wherein the second CS is a complement of a CE comprised by a first TRS-B of the virus, and the first CS is a complement of a CE comprised by a second TRS-B of the virus, wherein the virus is a (+)ssRNA virus; and optionally the (+)ssRNA of the invention comprises a third CS which is a complement of a CE comprised by a further TRS-B of the virus; or
(c) the (+)ssRNA of the invention comprises in 5' to 3' direction a CE comprised by a TRS-L of the virus, and a first CS which is a complement of a CE comprised by a first TRS-B of the virus, wherein the virus is a (+)ssRNA virus; and optionally the (+)ssRNA of the invention comprises a second CS which is a complement of a CE comprised by a second TRS-B of the virus.

"A TRS-L of the virus" here will be understood to refer to a TRS-L the virus (+)ssRNA. "A TRS-B of the virus" here will be understood to refer to a TRS-B of a complement of the virus (+)ssRNA, wherein the complement is a negative-strand single-stranded RNA ((−) ssRNA). Such a (−) ssRNA may be such a strand usually made during replication of the virus as is typical for (+)ssRNA viruses and will be apparent to the skilled addressee.

The first and second CSs may be identical to each other. The second and third CSs may be identical to each other. All of the CSs may be identical to each other. The CSs (and optionally also the CE) may be of the same nucleotide length (eg, 6, 7 or 8 consecutive nucleotides). Optionally, first CS may be the 100% complement of the CE of the first TRS-B. A 100% complement refers to the sequence of the first CS being complementary over its entire length to the CE, ie, each nucleotide of the first CS is a complement of a corresponding nucleotide of the CE, such that the 5'-most nucleotide of the first CS is the complement of the 3'-most nucleotide of the CE and so on.

In an example, the RNA of the invention or its complement is devoid of one, more or all open-reading frame (ORF) sequences of the virus and each said ORF is a CoV ORF selected from ORF1a, ORF1b, ORF3a, ORF6, ORF 7a, ORF7b, ORF8a, ORF8b, ORF10, an ORF encoding protein S, an ORF encoding protein E, an ORF encoding protein M and an ORF encoding protein N. Optionally, the RNA of the invention or its complement is devoid of one, two, three or all of an ORF encoding protein S, an ORF encoding protein E, an ORF encoding protein M and an ORF encoding protein N. For example, the RNA of the invention or its complement is devoid of an ORF encoding protein S. For example, the RNA of the invention or its complement is devoid of an ORF encoding protein E. For example, the RNA of the invention or its complement is devoid of an ORF encoding protein M. For example, the RNA of the invention or its complement is devoid of an ORF encoding protein N. For example, the virus is a SARS- or MERS-COV, such as SARS-COV or SARS-Cov-2.

In an embodiment, the (+)ssRNA is a mRNA. For example, the RNA is capable of transcription in a host cell (eg, any host cell disclosed herein) to produce a complement RNA thereof, wherein the complement is a negative-strand single-stranded RNA ((−) ssRNA). Optionally, the complement RNA comprises a complement of a (or each) TRS-CE of the (+)ssRNA. For example, each TRS-CE complement comprised by the (−) ssRNA is comprised by a respective TRS Body (TRS-B) sequence.

Optionally, the RNA comprises a 5' methylated cap and a 3' poly-A tail sequence.

The RNA of the invention may be a recombinant or isolated RNA. An isolated RNA may be an RNA free of cellular material or particles or unbound to a complementary RNA or complementary DNA. In an alternative, the RNA may be bound to a complementary RNA or a complementary DNA.

In an example, the (+)ssRNA is not in a mixture with a DNA. In an example, the (+)ssRNA is not in a mixture with a complementary DNA (ie, a DNA that is capable of hybridising to the RNA, such as when the RNA is present in a host cell such as a human host cell). In an example, the (+)ssRNA is not in a mixture with a complementary RNA (ie, a RNA that is capable of hybridising to the RNA, such as when the RNA is present in a host cell such as a human host cell).

There is also provided a composition comprising a plurality of (+)ssRNAs of the invention. In an example, the RNAs are identical. In another example, the composition comprises different (+)ssRNAs of the invention (for example, differing in sequences comprising TRS-B complements, optionally wherein the TRS-Bs comprise a common CE sequence, wherein the CE sequence is 100% identical to a TRS-CE sequence comprised by the viral (+)ssRNA genome).

(−) ssRNAs & DNAS

The invention also provides an isolated (−) ss RNA that is identical to a particle or VLP RNA disclosed herein or a complement thereof. There is also provided a plurality of such RNAs, wherein the RNAs are identical. Alternatively, the plurality comprises first and second such RNAs that are different from each other. The plurality of RNAs may be comprised by a composition, such as a pharmaceutical composition disclosed herein or a composition for use in the diagnosing or detecting method or use.

A configuration of the invention provides:

A negative-strand single-stranded RNA ((−) ssRNA), wherein the RNA comprises one or more (eg, 1, 2, 3, 4, 5, 6, 7, 8, 9, 10, 11, 12, or more) sequences each of which is a (i) complement sequence (CS) of a Transcription Regulatory Sequence Core Element (TRS-L CE) sequence of a virus having a (+)ssRNA genome (eg, any such virus disclosed herein, such as a CoV) or (ii) a TRS-B CE of the virus, wherein the RNA is devoid of one, more or all open-reading frame (ORF) sequences of the virus or their complement sequences.

In an example, each CS of (i) is comprised by a complement of a TRS-L sequence. In an example, each CE of (ii) is comprised by a TRS-B sequence. In an example, the 3'-most of said sequences is a complement of a TRS-L sequence and each of the other sequences is a TRS-B sequence of the virus.

When in a host cell, such as described above, a CS of (i) is capable of hybridizing to a TRS-L CE of a (+)ssRNA. Where this TRS-L is comprised by a (+)ssRNA strand produced in the life-cycle of the virus, the CS of (i) when in the RNA of the invention may render the (+)ss RNA non-functional for initiation of transcription and/or translation, thereby being non-functional for expression of a viral protein required for replication of the virus. This, therefore, provides competition with the virus for positive strands, transcription and translation as explained above. Thus, viral replication is reduced.

When in a host cell, such as described above, each CE of the (−) ss RNA of the invention is capable of hybridizing to a TRL-CE of a (+)ssRNA of the virus. This hybrid will be non-functional for production of an ORF protein product of the virus. This, therefore, provides competition with the virus for positive strands, transcription and translation as explained above. Additionally, any expressed, truncated or otherwise defective version of viral protein may compete with wild-type viral protein, leading to defective or non-productive virus production in the host cell. Thus, viral replication is reduced.

Another configuration provides:

A (−) ssRNA (optionally, an RNA as described in the immediately preceding paragraph) comprising a plurality of sequences each comprising a TRS-B CE of a virus, wherein the RNA is devoid of one, more or all open-reading frame (ORF) sequences of the virus or their complement sequences.

Optionally, each CE is 100% identical to a TRS-B CE sequence of the virus, or 100% identical except at 1, 2 or 3 (preferably 1) nucleotide positions.

Preferably, each CE or CS of the (−) ssRNA of the invention is immediately 3' of a complement of an RNA sequence encoding a truncated (eg, C-terminally truncated) or mutated ORF of the (+)ssRNA of the virus. For example, the RNA sequence is truncated compared to the entire corresponding ORF of the viral (+)ssRNA, and comprises (a) the first 5, 10, 15, 20, 25, 30, 35, 40, 45, 50, 80, 100 or 150 consecutive nucleotides (ie, the 5'-most nucleotides) of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire S ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire E ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire M ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. For example, the RNA sequence is truncated compared to the entire N ORF of the viral RNA genome, and comprises (a) the first 5, 10, 15, 20, 25, 30, 35, 40, 45, 50, 80, 100 or 150 consecutive nucleotides of the ORF in the viral (+)ssRNA; or (ii) no more than 70, 60, 50, 40, 30 30 or 10% of consecutive nucleotides of the ORF sequence of the viral (+)ssRNA. The feature (a) may be useful to preserve the native viral TRS/ORF sequence junction for proper transcription and/or translation of this part of the RNA of the invention, eg, in a cell. The truncated or mutated sequence may be translated into a correspondingly mutated or truncated form of the protein that is encoded by the viral ORF (eg, to form a truncated or mutated S, E, M or N) which is not functional for viral replication, propagation or infectivity. In this way, the RNA of the invention is not self-replicable in a host cell to form a virus particle. This may be useful for containment purposes, so that production of viral particles is not possible.

In an example of the (−) ss RNA of the invention, a last (3'-most) CS is a complement (eg, a 100% complement) of a CE comprised by a TRS-Leader (TRS-L) sequence of the (+)ss RNA of the virus. Alternatively or additionally, the first CE is a TRS-Body (TRS-B) CE sequence of the virus.

In an example, (a) the (−) ssRNA of the invention comprises in 3' to 5' direction a first CS and a second CS, wherein the first CS is a complement of a CE comprised by a TRS-L of the virus, and the second CS is a complement of a CE comprised by a first TRS-L of the virus, wherein the virus is a (+)ssRNA virus; and optionally the (−) ssRNA of the invention comprises a third CS which is a complement of a CE comprised by a TRS-L of the virus; or (b) the (−) ssRNA of the invention comprises in 3' to 5' direction a first CE and a second CE, wherein the second CE is a CE comprised by a first TRS-B of the virus, and the first CE is a CE comprised by a second TRS-B of the virus, wherein the virus is a (+)ssRNA virus; and optionally the (−) ssRNA of the invention comprises a third CE which is a CE comprised by a further TRS-B of the virus.

"A TRS-L of the virus" here will be understood to refer to a TRS-L the virus (+)ssRNA. "A TRS-B of the virus" here will be understood to refer to a TRS-B of a complement of the virus (+)ssRNA, wherein the complement is a negative-strand single-stranded RNA ((−) ssRNA). Such a (−) ssRNA may be such a strand usually made during replication of the virus as is typical for (+)ssRNA viruses and will be apparent to the skilled addressee.

The first and second CSs may be identical to each other. The first and second CEs may be identical to each other. The second and third CEs may be identical to each other. All of the CSs may be identical to each other. All of the CEs may be identical to each other. The CEs (and optionally also the CS) may be of the same nucleotide length (eg, 6, 7 or 8 consecutive nucleotides). Optionally, first CE may be 100% identical to the CE of the first TRS-B.

The (−) ss RNA of the invention may be a recombinant or isolated RNA. An isolated RNA may be an RNA free of cellular material or particles or unbound to a complementary RNA or complementary DNA. In an alternative, the RNA may be bound to a complementary RNA or a complementary DNA.

In an example, the (−) ss RNA is not in a mixture with a DNA. In an example, the (−) ssRNA is not in a mixture with a complementary DNA (ie, a DNA that is capable of hybridising to the RNA, such as when the RNA is present in a host cell such as a human host cell). In an example, the (−) ssRNA is not in a mixture with a complementary RNA (ie, a RNA that is capable of hybridising to the RNA, such as when the RNA is present in a host cell such as a human host cell).

There is also provided a composition comprising a plurality of (−) ssRNAs of the invention. In an example, the RNAs are identical. In another example, the composition comprises different (−) ssRNAs of the invention (for example, differing in sequences comprising TRS-Bs, optionally wherein the TRS-Bs comprise a common CE sequence, wherein the CE sequence is 100% identical to a TRS-CE sequence comprised by the viral (+)ssRNA genome).

The invention also provides a (−) strand DNA comprising or consisting of a DNA sequence that is complementary (eg, 100% complementary) to the RNA sequence of a (+) strand RNA of the invention. Optionally, the DNA sequence is operably connected to a promoter for transcription of the RNA using the DNA as a template. The promoter will conventionally be 5' of the DNA sequence in the DNA strand. The transcription may be carried out in a producer cell, such as a eukaryotic, prokaryotic, mammalian, yeast, human, insect or rodent cell. For example, the producer cell is a HEK293 cell. For example, the producer cell is a COS cell. For example, the producer cell is a CHO cell.

Thus, in a configuration there is provided:

A method of producing a plurality of RNAs of the invention, wherein the method comprises expressing the RNAs in producer cells using nucleic acids of the producer cells encoding the RNAs, and optionally isolating the plurality of RNAs from the cells.

In an example, the producer cell nucleic acids are (−) strand DNAs of the invention; in another example the producer cell nucleic acids are (−) strand RNAs of the invention; and optionally the virus is a (+)ss RNA virus. Thus, a plurality of (+)ss RNAs are produced which can be used in detection or diagnosis methods or uses herein wherein the virus is a (+)ssRNA virus. Alternatively, a plurality of (+)ss RNAs are produced which can be introduced into host cells before, after or simultaneously with infection of the cells with a (+)ss RNA virus for competing with the virus and reducing replication thereof as described herein. In an example, therefore, there is provided:

A method of producing particles (eg, VLPs) of the invention, the method comprising combining said plurality of RNAs with a plurality of structural proteins or capsid proteins of the virus, whereby the particles are formed each comprising one or more of the RNAs; and optionally the method comprises isolating the particles (eg, to produce a composition in which the particles are not mixed with non-particle-associated RNA). Optionally, the composition is a pharmaceutical composition as described herein.

Concept

There are provided the following Concepts; these are not to be construed as claims (the claims herein are below, commencing with the title "CLAIMS:").

1. A particle for administration to a human or animal subject to treat or reduce the risk of an infection of the subject by a virus, wherein the virus comprises an RNA genome,
   (A) wherein the virus is capable of infecting host cells of the subject, the virus genome comprising an RNA sequence (L) wherein L comprises a first Transcription Regulatory Sequence Core Element (TRS-CE1), wherein replication of the virus comprises the transcription of a first sub-genomic RNA (sgRNA1), (B) wherein sgRNA1 comprises a second Transcription Regulatory Sequence Core Element (TRS-CE2), wherein TRS-CE1 is capable of hybridising to TRS-CE2 in the host cells;
   (C) wherein the particle comprises RNA, wherein the particle is capable of introducing the particle RNA into host cells of the subject for transcription of the particle RNA, wherein the particle RNA or a transcript thereof comprises a TRS-CE;
   (D) wherein when the viral RNA is present in a host cell with the particle RNA or the transcript, the TRC-CE of the particle RNA or transcript hybridises to a TRS-CE comprised by the viral RNA, wherein the hybridising reduces viral replication.

In an alternative, Concept 1 provides:

A particle (eg, a virus-like particle (VLP)) for administration to a human or animal subject to treat or reduce the risk of an infection of the subject by a virus, wherein the virus comprises an RNA genome, wherein the virus is capable of infecting host cells of the subject (eg, human cells), the virus genome comprising an RNA sequence (L) wherein L comprises a first Transcription Regulatory Sequence Core Element (TRS-CE1), wherein replication of the virus comprises the transcription of a first sub-genomic RNA (sgRNA1), wherein sgRNA1 comprises a second transcription regulatory sequence core element (TRS-CE2), wherein TRS-CE1 is capable of hybridising to TRS-CE2 in the host cells; wherein the particle comprises RNA, wherein the particle is capable of introducing the particle RNA into host cells of the subject for transcription of the particle RNA, wherein the particle RNA or a transcript thereof
   (i) comprises (a) TRS-CE1 or (b) a sequence that is capable of hybridising to TRS-CE1 in a host cell; and/or
   (ii) comprises (a) TRS-CE2 or (b) a sequence that is capable of hybridising to TRS-CE2 in a host cell;
   wherein when the viral RNA is present in a host cell with the particle RNA or the transcript,
   (iii) component (i) (a) hybridises to TRS-CE2 comprised by sgRNA1 encoded by the viral RNA;
   (iv) component (i) (b) hybridises to TRS-CE1 comprised by the viral RNA;
   (v) component (ii) (a) hybridises to TRS-CE1 comprised by the viral RNA; and/or
   (vi) component (ii) (b) hybridises to TRS-CE2 comprised by sgRNA1 encoded by the viral RNA;
   wherein the hybridising of any of (iii) to (vi) reduces viral replication.

2. The particle of Concept 1, wherein
   (A) the particle RNA (eg, a (+)ss RNA) comprises a regulatory element that is operable for protein translation, wherein the regulatory element is operably linked 5' of component (i) (a) or (ii) (b);
   (B) the particle RNA (eg, a (+)ss RNA) comprises component (i) (a) or (ii) (b) and the particle RNA is devoid of an RNA sequence that is 3' of said component and that is expressible to produce an amino acid sequence (A) of a protein required for replication, propagation or infectivity of said virus;
   (C) particle RNA (eg, (−) ss RNA) comprises component (i) (b) or (ii) (a) and the particle RNA is devoid of an RNA sequence that is 5' of said component and that is expressible to produce an RNA sequence encoding an amino acid sequence of a protein required for replication, propagation or infectivity of said virus.

3. The particle of any preceding Concept, wherein the particle RNA (eg, (−) ss RNA) or a transcript thereof (eg, a (−) ss RNA transcript) comprises multiple copies of TRS-CEs that each is capable of hybridising to TRS-CE1 in a host cell, wherein none of said copies of TRS-CEs is operably connected to an RNA sequence that is expressible to produce an RNA sequence encoding a protein that is essential for replication or propagation of the virus.

4. The particle of any preceding Concept, wherein the particle RNA capable of replication in host cells.

5. The particle of any preceding Concept, wherein the particle RNA comprises a regulatory element required for recognition and binding by a RNA-dependent RNA polymerase (RdRP) encoded by the viral genome; optionally wherein the regulatory element is identical to a regulatory element comprised by the viral genome.

6. The particle of any preceding Concept, wherein the particle RNA comprises a packaging signal that is capable of being recognised by the viral packaging machinery to package particle RNA into viral capsids that are capable of infecting host cells.

7. The particle of any preceding Concept, wherein the RNA hybrid produced by any of (iii) to (vi) is capable of being 3' extended by the host cell to produce an RNA product, wherein said RNA product is non-productive in the cell for expression of a protein required for replication, propagation or infectivity of said virus.

8. The particle of any preceding Concept, wherein the particle comprises a receptor or ligand for the host cell that is identical to the receptor or ligand that the virus uses to bind to the host cell; optionally wherein the ligand is a viral spike glycoprotein and/or the ligand is capable of binding to a ACE2 protein on the surface of the host cell (eg, wherein the virus is a SARS-COV or SARS-COV-2 virus) or DPP4 protein on the surface of the host cell (eg, wherein the virus is a MERS-COV virus).

9. The particle of any preceding Concept, wherein
   (A) replication of the virus comprises the transcription of first and second sub-genomic RNAs (sgRNA), wherein each sgRNA comprises a transcription regulatory sequence core element (TRS-CE) wherein each TRS-CE of the sgRNAs is capable of hybridising to the sequence of a TRS-CE1 comprised by the particle RNA in a host cell; or (B) transcription of the particle RNA produces first and second sub-genomic RNAs (sgRNA), wherein each sgRNA comprises a transcription regulatory sequence body core element (TRS-B CE) wherein each TRS-CE of the sgRNAs is capable of hybridising to the sequence of a TRS-L CE1 comprised by the viral RNA in a host cell 10. The particle of any preceding Concept, wherein the particle is non-self replicative in cells of said subject (eg, in human cells).

11. The particle of any preceding Concept, wherein the RNA genome of the virus is a plus-strand RNA genome and the particle RNA is a plus-strand RNA.

12. The particle of any preceding Concept, wherein TRS-CE1 is from 6 to 12 consecutive nucleotides and/or TRS-CE2 is from 6 to 12 consecutive nucleotides.

13. The particle of any preceding Concept, wherein CE1 is, in 5' to 3' direction, ACGAAC and/or CE2 is, in 5' to 3' direction, GUUCGU.

14. The particle of any preceding Concept, wherein the particle RNA comprises an RNA sequence that is 100% complementary to CE2 and wherein said RNA sequence is identical to CE1.

15. The particle of any preceding Concept, wherein the sequence of CE2 is 100% complementary to CE1; or CE2 is complementary to CE1 over all of the nucleotides of CE2 except 1, 2 or 3 nucleotides.

16. The particle of any preceding Concept, wherein TRS-CE1 is comprised by a viral Transcription Regulatory Sequence (TRS1) of from 8 to 25 consecutive nucleotides and/or TRS-CE2 is comprised by a viral TRS (TRS2) of from 8 to 30 consecutive nucleotides.

17. The particle of Concept 16, wherein TRS1 comprises the sequence, in 5' to 3' direction, NNN-CE1 wherein CE1 is at the 3' terminus of the TRS1; or NNN-CE1-NNN, wherein each N is any nucleotide selected from A, U, C and G; optionally wherein CE1 is, in 5' to 3' direction, ACGAAC.

18. The particle of Concept 16 or 17, wherein TRS1 comprises, in 5' to 3' direction,
(A) UAA-CE1, UCUCUAA-CE1, AGU-CE1 or UGAGU-CE1;
(B) CE1-UU, CE1-UUU, CE1-UAA, CE1-UAACU, CE1-UAAAU or CE1-UU;
(C) UAA-CE1-UU, UAA-CE1-UUU, UCUCUAA-CE1-UUU, GGUCUAA-CE1-UAACU, GGUCUAA-CE1-UAAAU, AGU-CE1-UU or UGAGU-CE1-UU; or
(D) CUAA-CE1, UAA-CE1 or UCUAA-CE1.

19. The particle of any one of Concepts 16 to 18, wherein TRS2 comprises the sequence, in 5' to 3' direction, NNN-CE2 wherein CE2 is at the 3' terminus of the TRS2; or NNN-CE2-NNN, wherein each N is any nucleotide selected from A, U, C and G; optionally wherein CE2 is, in 5' to 3' direction, ACGAAC.

20. The particle of any one of Concepts 16 to 19, wherein TRS2 comprises, in 5' to 3' direction,
(A) UAA-CE2, UCUCUAA-CE2, AGU-CE2 or UGAGU-CE2;
(B) CE2-UU, CE2-UUU, CE2-UAA, CE2-UAACU, CE2-UAAAU or CE2-UU; or
(C) UAA-CE2-UU, UAA-CE2-UUU, UCUCUAA-CE2-UUU, GGUCUAA-CE2-UAACU, GGUCUAA-CE2-UAAAU, AGU-CE2-UU or UGAGU-CE2-UU.

21. The particle of any preceding Concept, wherein the virus is selected from a Nidovirus; a Coronavirinae virus; a Torovirinae virus; a SARS or MERS virus; or aSARS-COV, SARS-COV-2 or MERS-COV virus.

22. The particle of any preceding Concept, wherein sgRNA1 is a (−) ss RNA, the particle RNA is a (+)ssRNA and the viral genome is a (+)ss RNA.

23. The particle of any preceding Concept, wherein the particle RNA
(i) comprises TRS-CE1; and/or
(ii) a sequence that is capable of hybridising to TRS-CE2 in a host cell;
wherein when the viral RNA is present in a host cell with the particle RNA,
(iii) component (i) hybridises to TRS-CE2 comprised by sgRNA1 encoded by the viral RNA; and/or
(iv) a complement of component (ii) hybridises to TRS-CE1 comprised by the viral RNA wherein the hybridising of (iii) and/or (iv) reduces viral replication.

24. The particle of any preceding Concept, wherein
(A) the CE1 of the particle RNA or component (ii) (b) of the particle is comprised by a TRS-L sequence, such as a TRS-L sequence that is identical to or at least 90, 95, 96, 97, 98 or 99% identical to a TRS-L sequence of the virus; and/or
(B) the CE2 of the particle RNA or component (i) (b) of the particle is comprised by a TRS-B sequence, such as a TRS-B sequence that is identical to or at least 90, 95, 96, 97, 98 or 99% identical to a TRS-B sequence of the virus 25. The particle of any preceding Concept, wherein the particle RNA is no greater than 120% the length of the viral RNA genome.

26. The particle of any preceding Concept, wherein the particle RNA is obtainable by replacing some or all of the sequence of each open reading frame (ORF) of the viral RNA genome with an RNA sequence that is no more than 120% (preferably 100%) the size of the ORF sequence that it replaces, wherein each ORF of the virus is rendered non-functional but the TRS sequences of the viral RNA are retained in the particle RNA.

27. A (+)ssRNA (optionally, an RNA as described in any preceding Concept) comprising a plurality of sequences each comprising a complement sequence (CS) of a TRS-B CE of a sgNRA produced by a virus that infects host cells of a human or animal subject, wherein the (+)ssRNA is devoid of one, more or all open-reading frame (ORF) sequences of the virus and is transcribable in a host cell to produce one or more transcripts each comprising a TRS-B CE; wherein each TRS-B CE is capable of hybridising to a TRS-L CE of the virus whereby each transcript is capable of inhibiting the expression of one or more virus ORF protein products.

28. The RNA of Concept 27, wherein the virus is a (+)ss RNA virus of a type that replicates using discontinuous RNA transcription.

29. The RNA of Concept 27 or 28, wherein each TRS-B CE is comprised by a TRS-B of the respective transcript; optionally wherein the TRS-B comprises the TRS2 sequence recited in Concept 19 or 20.

30. A composition comprising a plurality of particles or RNAs according to any preceding Concept.

31. The composition of Concept 30 for administration to a human or animal subject to treat or reduce the risk of an infection of the subject by the virus, or to treat or reduce the risk of a symptom of infection of the subject by the virus.

32. The composition of Concept 30 or 31 wherein the composition is comprised by an inhaler or nebuliser; or comprised by nucleic acid injection device, such as a gene-gun.

33. A method for treating or reducing the risk of an infection of a human or animal subject by a virus, the method comprising administering the composition of Concept 30, 31 or 32 to the subject.

34. A method for treating or reducing the risk of a symptom (eg, inflammation) of an infection of a human or animal subject by a virus, the method comprising administering the composition of Concept 30, 31 or 32 to the subject.

35. A method of inhibiting replication of a virus in a host cell, wherein the virus comprises a (+)ss RNA genome wherein the viral genome comprises a TRS-L CE and encodes an sgRNA transcript comprising a TRS-B CE (CE2), the method comprising
  a) contacting the host cell with a particle or RNA of the invention and introducing the RNA of the invention (eg, particle RNA) (hereafter First RNA) into the host cell, wherein the first RNA is a (+)ss RNA that comprises a sequence that is a complement (eg, a 100% or at least an 80% complement) of the CE2;
  b) simultaneously to step (a), subsequent to step (a) or before step (a) the viral RNA genome is introduced into the host cell; and
  a transcription process is carried out wherein the first RNA is transcribed in the cell to produce an RNA transcript comprising CE2 or a sequence that is capable of hybridising to a viral TRS-L CE, wherein the transcript hybridises to a TRS-L CE comprised by (+)ss RNA of the virus to form an RNA hybrid, and the hybrid is used to produce a mRNA comprising a leader sequence (L), wherein the leader is not operably linked to an RNA sequence that encodes an amino acid sequence (A) of a protein required for replication, propagation or infectivity of said virus.
  Optionally, the hybrid is elongated in the 5' to 3 direction (eg, by 1, 2, 3 or more codons, optionally less than 150 codons) to produce the mRNA.

36. The method of Concept 35, wherein CES2 in the transcript or said sequence that is capable of hybridising to a viral TRS-L CE is immediately 3' of
  (A) an RNA sequence encoding a mRNA sequence that is expressible in the host cell to produce a protein that is not required for replication, propagation or infectivity of said virus; or
  (B) an RNA sequence that does not comprise a complement of an open reading frame (ORF); or
  (C) an RNA sequence that does not comprise a complement of an open reading frame (ORF) of the virus.

37. A method of producing a plurality of particles, the method comprising combining a plurality of particles (eg, VLPs, liposomes, nanoparticles, exosomes or microvesicles) with a plurality of RNAs, wherein each RNA is an RNA of the invention, wherein at least one RNA is incorporated in and/or on a respective particle of the plurality of particles; and optionally formulating the particles to produce a pharmaceutical composition for administration to a human or animal subject to treat or prevent viral infection.

38. A method of detecting virus RNA in a sample, wherein the virus replicates using a discontinuous RNA transcription process comprising hybridizing of a first TRS-CE (CE1) with a second TRS-CE (CE2), the method comprising contacting the sample with an RNA of the invention (first RNA) and detecting a hybrid formed between the first RNA and a virus RNA comprised by the sample.

39. A DNA comprising a DNA sequence that is a complement of an RNA of the invention; optionally wherein the DNA sequence is operable linked to a promoter for transcribing the RNA in a host cell.

40. Use of an RNA or an DNA of the invention for diagnosing a viral infection in a human or animal subject, wherein the virus replicates using a discontinuous RNA transcription process.

41. A method of treating or preventing a viral infection in a human or animal subject, the method comprising administering to the subject a particle or RNA of the invention.

It will be understood that particular embodiments described herein are shown by way of illustration and not as limitations of the invention. The principal features of this invention can be employed in various embodiments without departing from the scope of the invention. Those skilled in the art will recognise, or be able to ascertain using no more than routine study, numerous equivalents to the specific procedures described herein. Such equivalents are considered to be within the scope of this invention and are covered by the claims. All publications and patent applications mentioned in the specification are indicative of the level of skill of those skilled in the art to which this invention pertains. All publications and patent applications (including US equivalents of all mentioned patent applications and patents) are herein incorporated by reference to the same extent as if each individual publication or patent application was specifically and individually indicated to be incorporated by reference. The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Any part of this disclosure may be read in combination with any other part of the disclosure, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Example 1: RNA Design

Analysis was performed between the genomic sequences of a SARS-COV virus and a SARS-COV-2 virus (Wuhan in Table 2 below). TRS sequences associated with various ORFs in the viruses were aligned and revealed remarkable similarity as shown in Table 2, enabling RNA designs detailed below.

TABLE 2

TRS sequence comparison of two Highly Pathogenic Human Coronaviruses (SARS-CoV & SARS-CoV-2)

|  | BASE | ORF* | TRS SEQUENCE** | SEQ ID |
|---|---|---|---|---|
| SARS | 60 | Leader | UCUCUAAACGAACUUUAAAAUCUGUG | A |
| WUHAN | 63 |  | UCUCUAAACGAACUUUAAAAUCUGUG | B |
| SARS | 21,479 | S (Spike) | CAACUAAACGAAC | C |
| WUHAN | 21,549 |  | CAACUAAACGAAC | D |
| SARS | 25,252 | ORF3 | CACAUAAACGAACUU | E |
| WUHAN | 25,378 |  | CACAUAAACGAACUU | F |
| SARS | 26,104 | E (Envelope) | UGAGUACGAACUU | G |
| WUHAN | 26,232 |  | UGAGUACGAACUU | H |
| SARS | 26,341 | M (Membrane) | GGUCUAAACGAACUAACU | I |
| WUHAN | 26,466 |  | GGUCUAAACGAACUAAAU | J |

*Open Reading Frame (i.e.-encodes for a protein);
**SARS TRS is TRS sequences of SARS-CoV as disclosed in Mara et al, "The Genome Sequence of the SARS-Associated Coronavirus", Science 30 May 2003: Vol. 300, Issue 5624, pp. 1399-1404, DOI: 10.1126/science.1085953, the disclosure and sequences (eg, TRS and CE sequences) therein being incorporated herein by reference for possible use in the invention RNA will be produced comprising the following TRS sequences (in 5' to 3' direction on a positive-strand ssRNA)

RNA Design 1: SEQ B, D, H, J; no coding sequences for S, E and M are present in the RNA RNA Design 2: SEQ D, H, J (each sequence being immediately 3' of a regulatory region for transcription and translation of the sequence); no coding sequences for S, E and M are present in the RNA RNA Design 3: SEQ B, D, D, D; no coding sequences for S are present in the RNA RNA Design 4: SEQ B, H, H, H; no coding sequences for E are present in the RNA RNA Design 5: SEQ B, J, J, J; no coding sequences for M are present in the RNA RNA Design 6: SEQ B, D, D, J, J; no coding sequences for S or M are present in the RNA RNA Design 7: SEQ D, D, D; (each sequence being immediately 3' of a regulatory region for transcription and translation of the sequence); no coding sequences for S are present in the RNA RNA Design 8: SEQ B, H, H, H; (each sequence being immediately 3' of a regulatory region for transcription and translation of the sequence); no coding sequences for E are present in the RNA RNA Design 9: SEQ B, J, J, J; (each sequence being immediately 3' of a regulatory region for transcription and translation of the sequence); no coding sequences for M are present in the RNA RNA Design 10: SEQ B, D, D, J, J; (each sequence being immediately 3' of a regulatory region for transcription and translation of the sequence); no coding sequences for S or M are present in the RNA RNA Design 11: SEQ A, C, G, I; no coding sequences for S, E and M are present in the RNA RNA Design 12: SEQ C, G, I (each sequence being immediately 3' of a regulatory region for transcription and translation of the sequence); no coding sequences for S, E and M are present in the RNA RNA Design 13: SEQ A, C, C, C; no coding sequences for S are present in the RNA RNA Design 14: SEQ A, G, G, G; no coding sequences for E are present in the RNA RNA Design 15: SEQ A, I, I, I; no coding sequences for M are present in the RNA RNA Design 16: SEQ A, C, C, I, I; no coding sequences for S or M are present in the RNA RNA Design 17: SEQ C, C, C; (each sequence being immediately 3' of a regulatory region for transcription and translation of the sequence); no coding sequences for S are present in the RNA RNA Design 18: SEQ A, G, G, G; (each sequence being immediately 3' of a regulatory region for transcription and translation of the sequence); no coding sequences for E are present in the RNA RNA Design 19: SEQ A, I, I, I; (each sequence being immediately 3' of a regulatory region for transcription and translation of the sequence); no coding sequences for M are present in the RNA RNA Design 20: SEQ A, C, C, I, I; (each sequence being immediately 3' of a regulatory region for transcription and translation of the sequence); no coding sequences for S or M are present in the RNA VLPs can be produced encapsulating just one design of RNA (eg, Design 1) or 2, 3 or more of the designs (eg, wherein each VLP comprises one type of RNA design). In an alternative, first VLPs can be produced encapsulating just one design of RNA (eg, Design 1), and second VLPs can be produced encapsulating just one design of RNA (eg, Design 2) which is different from the design used for the first VLPs. The first VLPs can be administered simultaneously or sequentially with the second VLPs to a subject suffering from or at risk of a CoV, eg, SARS-CoV2 or SARS-Cov infection. Administration may be administration to the lung.

Example 2: VLP Production & Treatment of Viral Infection

Positive-strand RNAs are produced, each with a length within 10% size (eg, 100% of the RNA genome of a of SARS-COV-2 or SARS-COV virus. Each RNA comprises a plurality of TRS-Bs comprised by the wild-type genome of the virus (and optionally also comprising the leader of the wild-type viral genome). For example, each RNA is a RNA of any of the designs in Example 1. Each TRS-B is immediately 5' of a sequence that does not encode a viral protein and each RNA comprises the 5' cap and 3' poly-A tail of the viral genome RNA. Thus, the RNAs are not expressible to produce any virus proteins. In an embodiment, a coronavirus packaging signal is incorporated into each RNA. Each RNA is capable of being recognized and replicated by RdRP of the virus.

VLPs are produced that comprise capsid and spike proteins of SARS-COV-2 or SARS-CoV virus. In the production process, RNAs of this example are encapsulated in VLPs.

An inhalable pharmaceutical formulation will be produced comprising the VLPs and delivered to a human patient by nebulizer or inhaler for delivery to the lung. The patient is suffering from an infection of the virus. VLPs will deliver RNAs of the example into host cells that are infected by the virus and may deliver RNAs into non-infected cells in the lung. This treatment will reduce the infection or slows progression of the infection or spread in the patient. In an alternative, the VLPs are administered systemically to the patient, eg, by IV administration. In another alternative, intranasal administration is used. A steroid or interferon may be administered in addition to the VLPs.

TABLE 3

Sequence Summary

| SEQ ID NO: | TRS SEQUENCE | SOURCE |
| --- | --- | --- |
| 1 | CUCUAAACGAACUU | Table 1 |
| 2 | AACUAAACGAACA | Table 1 |
| 3 | ACAUAAACGAACUU | Table 1 |
| 4 | AUGAGUACGAACUU | Table 1 |
| 5 | GUCUAAACGAACUA | Table 1 |
| 6 | UACAUCACGAACGC | Table 1 |
| 7 | GAUUAAACGAAC | Table 1 |
| 8 | GCCUAAACGAAC | Table 1 |
| 9 | AUCUAAACGAACAA | Table 1 |
| 10 | GCCUAAACUCAUGC | Table 1 |
| 11 | UCUCUAAACGAACUUUAAAAUCUGUG | Table 2 |
| 12 | CAACUAAACGAAC | Table 2 |
| 13 | CACAUAAACGAACUU | Table 2 |
| 14 | UGAGUACGAACUU | Table 2 |
| 15 | GGUCUAAACGAACUAACU | Table 2 |
| 16 | GGUCUAAACGAACUAAAU | Table 2 |
| 17 | CUAAACGAAC | |
| 18 | UCUAAACGAAC | |
| 19 | UAAACGAACUU | |

The invention claimed is:

1. A method of treating or reducing the risk of an infection or a symptom of an infection in a human or animal subject by a virus, the method comprising:

administering to the subject a pharmaceutical composition comprising a plurality of a particle comprising a first RNA, wherein the particle introduces the first RNA into host cells of the subject for transcription of the first RNA, wherein the first RNA or a transcript thereof comprises a Transcription Regulatory Sequence Core Element (TRS-CE), wherein the virus is capable of infecting host cells of the subject, wherein the virus comprises an RNA genome comprising an RNA leader sequence (L) wherein L comprises a first Transcription Regulatory Sequence Core Element (TRS-CE1), wherein replication of the virus comprises the transcription of a first sub-genomic RNA (sgRNA1), wherein the sgRNA1 comprises a second Transcription Regulatory Sequence Core Element (TRS-CE2), wherein TRS-CE1 is capable of hybridising to TRS-CE2 in the host cells;

wherein when the viral RNA is present in a host cell with the first RNA or the transcript, the TRC-CE of the first RNA or transcript hybridizes to the TRS-CE1 or TRS-CE2 comprised by the viral RNA, wherein the hybridising reduces viral replication.

2. The method of claim 1, wherein:

(i) the TRS-CE of the first RNA or transcript thereof comprises (a) a copy of TRS-CE1 or (b) a sequence that is capable of hybridising to TRS-CE1 in the host cell, wherein when the viral RNA is present in a host cell with the first RNA or the transcript, the copy of TRS-CE1 hybridizes to TRS-CE2 comprised by sgRNA1 encoded by the viral RNA, or the sequence that is capable of hybridizing to TRS-CE1 hybridizes to TRS-CE1 comprised by the viral RNA; and/or (ii) the TRS-CE of the first RNA or transcript thereof comprises (a) a copy of TRS-CE2 or (b) a sequence that is capable of hybridising to TRS-CE2 in the host cell, wherein when the viral RNA is present in a host cell with the first RNA or the transcript, the copy of TRS-CE2 hybridizes to TRS-CE1 comprised by leader sequence (L) comprised by the viral RNA, or the sequence that is capable of hybridizing to TRS-CE2 hybridizes to TRS-CE2 comprised by sgRNA1 encoded by the viral RNA;

whereby viral replication is reduced in the host cell.

3. The method of claim 2, wherein the first RNA comprises a copy of TRS-CE1 or a sequence that is capable of hybridizing to TRS-CE2 in the host cell, and:
   (A) the first RNA comprises a regulatory element that is operable for protein translation, wherein the regulatory element is operably linked 5' of the copy of TRS-CE1 or the sequence that is capable of hybridizing to TRS-CE2 in the host cell;
   (B) the first RNA is devoid of an RNA sequence that is 3' of the copy of TRS-CE1 or the sequence that is capable of hybridizing to TRS-CE2 in the host cell, wherein said devoid RNA sequence is expressible to produce an amino acid sequence of a protein required for replication, propagation or infectivity of said virus; or
   (C) the first RNA is devoid of an RNA sequence that is 5' of the copy of TRS-CE2 or the sequence that is capable of hybridizing to TRS-CE1 in the host cell, wherein said devoid RNA sequence is expressible to produce an RNA sequence encoding an amino acid sequence of a protein required for replication, propagation or infectivity of said virus.

4. The method of claim 1, wherein the first RNA or a transcript thereof comprises multiple copies of TRS-CEs that each is capable of hybridising to TRS-CE1 of the virus in a host cell, wherein none of said copies of TRS-CEs is operably connected to an RNA sequence that is expressible to produce an RNA sequence encoding a protein that is essential for replication or propagation of the virus.

5. The method of claim 1, wherein the first RNA comprises
   (A) a regulatory element required for recognition and binding by a RNA-dependent RNA polymerase (RdRP) encoded by the viral genome; and/or
   (B) a packaging signal that is capable of being recognised by the viral packaging machinery to package first RNA into viral capsids that are capable of infecting host cells.

6. The method of claim 2, wherein the RNA hybrid produced by hybridization of the first RNA to the viral RNA is 3' extended by the host cell to produce an RNA product, wherein said RNA product is non-productive in the cell for expression of a protein required for replication, propagation or infectivity of said virus.

7. The method of claim 1, wherein the particle comprises a receptor or ligand for the host cell that is identical to the receptor or ligand that the virus uses to bind to the host cell.

8. The method of claim 7, wherein the receptor or ligand is a viral spike glycoprotein.

9. The method of claim 1, wherein
   (A) replication of the virus comprises the transcription of first and second sub-genomic RNAs (sgRNA), wherein each sgRNA comprises a Transcription Regulatory Sequence Core Element (TRS-CE) wherein each TRS-CE of the sgRNAs is capable of hybridising to the sequence of a TRS-CE1 comprised by the first RNA in a host cell; or
   (B) transcription of the first RNA produces first and second sub-genomic RNAs (sgRNA), wherein each sgRNA comprises a Transcription Regulatory Sequence Body Core Element (TRS-B CE) wherein each TRS-CE of the sgRNAs is capable of hybridising to the sequence of a Transcription Regulatory Sequence Leader Core Element (TRS-L CE) comprised by the viral RNA in a host cell.

10. The method of claim 1, wherein (i) the RNA genome of the virus is a plus-strand RNA genome and the first RNA is a plus-strand RNA; or (ii) the first RNA is a minus-strand RNA.

11. The method of claim 1, wherein
   (A) the first RNA is a (+)ss RNA comprising one or more sequences, wherein each sequence comprises 5'-ACGAAC-3'; and the virus RNA is a (+)ss RNA, whose RNA genome comprises one or more 5'-ACGAAC-3' sequences;
   (B) the first RNA is transcribable in a host cell to produce a (+)ss RNA comprising one or more sequences, wherein each sequence comprises 5'-ACGAAC-3'; and the virus RNA is a (+)ss RNA, whose RNA genome comprises one or more 5'-ACGAAC-3' sequences;
   (C) the first RNA is transcribable in a host cell to produce a (−) ss RNA comprising one or more sequences, wherein each sequence comprises 5'-GUUCGU-3'; and the virus RNA is a (+)ss RNA, whose RNA genome comprises one or more 5'-ACGAAC-3' sequences; or
   (D) the first RNA is a (−) ss RNA comprising one or more sequences, wherein each sequence comprises 5'-GUUCGU-3'; and the virus RNA is a (+)ss RNA, whose RNA genome comprises one or more 5'-ACGAAC-3' sequences;
   (E) CE1 is, in 5' to 3' direction, ACGAAC and/or CE2 is, in 5' to 3' direction, GUUCGU.

12. The method of claim 1, wherein TRS-CE1 is comprised by a first viral Transcription Regulatory Sequence (TRS1) of from 8 to 25 consecutive nucleotides and wherein TRS1 comprises, in 5' to 3' direction, UAA-CE1, UCUC-UAA-CE1, AGU-CE1, UGAGU-CE1, CE1-UU, CE1-UUU, CE1-UAA, CE1-UAACU, CE1-UAAAU, CE1-UU, UAA-CE1-UU, UAA-CE1-UUU, UCUCUAA-CE1-UUU, GGUCUAA-CE1-UAACU, GGUCUAA-CE1-UAAAU, AGU-CE1-UU, UGAGU-CE1-UU, CUAA-CE1, UAA-CE1 or UCUAA-CE1;

and/or

TRS-CE2 is comprised by a second viral TRS (TRS2) of from 8 to 30 consecutive nucleotides and wherein TRS2 comprises, in 5' to 3' direction, UAA-CE2, UCUCUAA-CE2, AGU-CE2, UGAGU-CE2, CE2-UU, CE2-UUU, CE2-UAA, CE2-UAACU, CE2-UAAAU, CE2-UU, UAA-CE2-UU, UAA-CE2-UUU, UCUCUAA-CE2-UUU, GGUCUAA-CE2-UAACU, GGUCUAA-CE2-UAAAU, AGU-CE2-UU or UGAGU-CE2-UU.

13. The method of claim 1, wherein the virus a Nidovirus; a Coronavirinae virus, a Torovirinae virus, a SARS virus, or a MERS virus.

14. The method of claim 1, wherein
   (A) the TRS-CE of the first RNA or transcript thereof comprises (a) a copy of TRS-CE1 or (b) a sequence that is capable of hybridising to TRS-CE2 in the host cell, wherein when the viral RNA is present in a host cell with the first RNA or the transcript, the copy of TRS-CE1 hybridizes to TRS-CE2, and/or wherein a complement of the sequence that is capable of hybridising to TRS-CE2 hybridizes to TRS-CE1 in the host cell,
   whereby viral replication is reduced in the host cell; or
   (B) the TRS-CE of the first RNA or transcript thereof comprises (a) a copy of TRS-CE2 or (b) a sequence that is capable of hybridising to TRS-CE1 in the host cell, wherein when the viral RNA is present in a host cell with the first RNA or the transcript, the copy of TRS-CE2 hybridizes to TRS-CE1, and/or wherein a complement of the sequence that is capable of hybridising to TRS-CE1 hybridizes to TRS-CE2 in the host cell, whereby viral replication is reduced in the host cell.

15. The method of claim 2, wherein
(A) the copy of TRS-CE1 or the sequence that is capable of hybridizing to TRS-CE2 in the host cell is comprised by a Transcription Regulatory Sequence Leader (TRS-L) sequence in the first RNA that is identical to or at least 90, 95, 96, 97, 98 or 99% identical to a TRS-L sequence of the virus; and/or
(B) the TRS-CE2 of the first RNA or the sequence that is capable of hybridizing to TRS-CE1 in the host cell is comprised by a Transcription Regulatory Sequence Body (TRS-B) sequence in the first RNA that is identical to or at least 90, 95, 96, 97, 98 or 99% identical to a TRS-B sequence of the virus.

16. The method of claim 1, wherein the first RNA is no greater than 120% the length of the viral RNA genome.

17. The method of claim 1, wherein
(A) the first RNA is a (+)ssRNA comprising a plurality of sequences each comprising a complement sequence (CS) of a TRS-B CE of a sgRNA produced by a virus that infects host cells of a human or animal subject, wherein the (+)ssRNA is devoid of one, more or all open-reading frame (ORF) sequences of the virus and is transcribable in a host cell to produce one or more transcripts each comprising a TRS-B CE; wherein each TRS-B CE is capable of hybridising to a TRS-L CE of the virus whereby each transcript is capable of inhibiting the expression of one or more virus ORF protein products; or
(B) the first RNA is a (−) ssRNA, wherein the first RNA comprises one or more sequences each of which is a (i) complement sequence of CE1 wherein the virus is a virus having a (+)ssRNA genome or (ii) a TRS-B CE of the virus, wherein the particle RNA is devoid of one, more or all open-reading frame (ORF) sequences of the virus or their complement sequences.

18. The method of claim 17, wherein the virus is a (+)ssRNA virus of a type that replicates using discontinuous RNA transcription.

19. A method of inhibiting replication of a virus in a host cell, wherein the virus comprises a (+)ssRNA genome wherein the viral genome comprises a TRS-L CE and encodes an sgRNA transcript comprising a TRS-B CE (CE2), the method comprising
a) contacting the host cell with a particle comprising a first RNA,
wherein the particle introduces the first RNA into the host cell for transcription of the first RNA, wherein the first RNA is a (+)ssRNA that comprises a sequence that is a complement of the CE2;
b) simultaneously to step (a), subsequent to step (a) or before step (a) the viral RNA genome is introduced into the host cell; and
c) a transcription process is carried out wherein the first RNA is transcribed in the cell to produce an RNA transcript comprising CE2 or a sequence that is capable of hybridising to a viral TRS-L CE, wherein the transcript hybridises to a TRS-L CE comprised by (+)ss RNA of the virus to form an RNA hybrid, and the hybrid is used to produce a mRNA comprising a leader sequence (L), wherein the leader is not operably linked to an RNA sequence that encodes an amino acid sequence (A) of a protein required for replication, propagation or infectivity of said virus.

20. The method of claim 19, wherein CE2 in the transcript or said sequence that is capable of hybridising to a viral TRS-L CE is immediately 3' of
(A) an RNA sequence encoding a mRNA sequence that is expressible in the host cell to produce a protein that is not required for replication, propagation or infectivity of said virus; or
(B) an RNA sequence that does not comprise a complement of an open reading frame (ORF); or
(C) an RNA sequence that does not comprise a complement of an open reading frame (ORF) of the virus.

21. An engineered RNA, wherein the RNA is a
(A) (+)ssRNA comprising a complement sequence (CS) of a TRS-B CE of a sgRNA produced by a virus that infects host cells of a human or animal subject, wherein the (+)ssRNA is devoid of one, more or all open-reading frame (ORF) sequences of the virus and is transcribable in a host cell to produce one or more transcripts each comprising a TRS-B CE; wherein each TRS-B CE is capable of hybridizing to a TRS-L CE of the virus whereby each transcript is capable of inhibiting the expression of one or more virus ORF protein products; or
(B) (−) ssRNA comprising a complement sequence (CS) of a TRS-L CE of a leader sequence (L) of virus that infects host cells of a human or animal subject, wherein the (−) ssRNA is devoid of one, more or all open-reading frame (ORF) sequences of the virus and is transcribable in a host cell to produce one or more transcripts each comprising a TRS-L CE; wherein each TRS-L CE is capable of hybridizing to a TRS-B CE of a sgRNA produced by the virus whereby each transcript is capable of inhibiting the expression of one or more virus ORF protein products.

22. A particle comprising the engineered (+)ssRNA or (−) ssRNA of claim 21.

23. A method of producing a plurality of particles, the method comprising combining a plurality of particles with a plurality of RNAs, wherein each RNA is an RNA as recited in claim 21 (A) or (B), wherein at least one RNA is incorporated in and/or on a respective particle of the plurality of particles.

24. The method of claim 1, wherein
(i) the first RNA is a (−) ss RNA comprising sequence 5'-GUUCGU-3'; and the virus RNA is a (+)ss RNA, whose RNA genome comprises CE1 sequence 5'-ACGAAC-3';
(ii) the first RNA is devoid of an RNA sequence that is 5' of said sequence 5'-GUUCGU-3', wherein said devoid RNA sequence is expressible to produce an RNA sequence encoding an amino acid sequence of a protein required for replication, propagation or infectivity of said virus; and
(iii) the virus is SARS-COV-2.

25. The method of claim 13, wherein the virus is a SARS-COV-2 virus.

* * * * *

SEQUENCE LISTING

<160> NUMBER OF SEQ ID NOS: 19

<210> SEQ ID NO 1
<211> LENGTH: 14
<212> TYPE: RNA
<213> ORGANISM: Unknown
<220> FEATURE:
<223> OTHER INFORMATION: CoV

<400> SEQUENCE: 1
cucuaaacga acuu                                                          14

<210> SEQ ID NO 2
<211> LENGTH: 13
<212> TYPE: RNA
<213> ORGANISM: Unknown
<220> FEATURE:
<223> OTHER INFORMATION: CoV

```
<400> SEQUENCE: 2
aacuaaacga aca                                                    13

<210> SEQ ID NO 3
<211> LENGTH: 14
<212> TYPE: RNA
<213> ORGANISM: Unknown
<220> FEATURE:
<223> OTHER INFORMATION: CoV

<400> SEQUENCE: 3
acauaaacga acuu                                                   14

<210> SEQ ID NO 4
<211> LENGTH: 14
<212> TYPE: RNA
<213> ORGANISM: Unknown
<220> FEATURE:
<223> OTHER INFORMATION: CoV

<400> SEQUENCE: 4
augaguacga acuu                                                   14

<210> SEQ ID NO 5
<211> LENGTH: 14
<212> TYPE: RNA
<213> ORGANISM: Unknown
<220> FEATURE:
<223> OTHER INFORMATION: CoV

<400> SEQUENCE: 5
gucuaaacga acua                                                   14

<210> SEQ ID NO 6
<211> LENGTH: 14
<212> TYPE: RNA
<213> ORGANISM: Unknown
<220> FEATURE:
<223> OTHER INFORMATION: CoV

<400> SEQUENCE: 6
uacaucacga acgc                                                   14

<210> SEQ ID NO 7
<211> LENGTH: 12
<212> TYPE: RNA
<213> ORGANISM: Unknown
<220> FEATURE:
<223> OTHER INFORMATION: CoV

<400> SEQUENCE: 7
gauuaaacga ac                                                     12

<210> SEQ ID NO 8
<211> LENGTH: 12
<212> TYPE: RNA
<213> ORGANISM: Unknown
<220> FEATURE:
<223> OTHER INFORMATION: CoV

<400> SEQUENCE: 8
gccuaaacga ac                                                     12

<210> SEQ ID NO 9
<211> LENGTH: 14
```

<212> TYPE: RNA
<213> ORGANISM: Unknown
<220> FEATURE:
<223> OTHER INFORMATION: CoV

<400> SEQUENCE: 9
aucuaaacga acaa 14

<210> SEQ ID NO 10
<211> LENGTH: 14
<212> TYPE: RNA
<213> ORGANISM: Unknown
<220> FEATURE:
<223> OTHER INFORMATION: CoV

<400> SEQUENCE: 10
gccuaaacuc augc 14

<210> SEQ ID NO 11
<211> LENGTH: 26
<212> TYPE: RNA
<213> ORGANISM: Unknown
<220> FEATURE:
<223> OTHER INFORMATION: CoV

<400> SEQUENCE: 11
ucucuaaacg aacuuuaaaa ucugug 26

<210> SEQ ID NO 12
<211> LENGTH: 13
<212> TYPE: RNA
<213> ORGANISM: Unknown
<220> FEATURE:
<223> OTHER INFORMATION: CoV

<400> SEQUENCE: 12
caacuaaacg aac 13

<210> SEQ ID NO 13
<211> LENGTH: 15
<212> TYPE: RNA
<213> ORGANISM: Unknown
<220> FEATURE:
<223> OTHER INFORMATION: CoV

<400> SEQUENCE: 13
cacauaaacg aacuu 15

<210> SEQ ID NO 14
<211> LENGTH: 13
<212> TYPE: RNA
<213> ORGANISM: Unknown
<220> FEATURE:
<223> OTHER INFORMATION: CoV

<400> SEQUENCE: 14
ugaguacgaa cuu 13

<210> SEQ ID NO 15
<211> LENGTH: 18
<212> TYPE: RNA
<213> ORGANISM: Unknown
<220> FEATURE:
<223> OTHER INFORMATION: CoV

<400> SEQUENCE: 15

```
ggucuaaacg aacuaacu                                              18

<210> SEQ ID NO 16
<211> LENGTH: 18
<212> TYPE: RNA
<213> ORGANISM: Unknown
<220> FEATURE:
<223> OTHER INFORMATION: CoV

<400> SEQUENCE: 16
ggucuaaacg aacuaaau                                              18

<210> SEQ ID NO 17
<211> LENGTH: 10
<212> TYPE: RNA
<213> ORGANISM: Unknown
<220> FEATURE:
<223> OTHER INFORMATION: CoV

<400> SEQUENCE: 17
cuaaacgaac                                                       10

<210> SEQ ID NO 18
<211> LENGTH: 11
<212> TYPE: RNA
<213> ORGANISM: Unknown
<220> FEATURE:
<223> OTHER INFORMATION: CoV

<400> SEQUENCE: 18
ucuaaacgaa c                                                     11

<210> SEQ ID NO 19
<211> LENGTH: 11
<212> TYPE: RNA
<213> ORGANISM: Unknown
<220> FEATURE:
<223> OTHER INFORMATION: CoV

<400> SEQUENCE: 19
uaaacgaacu u                                                     11
```